(12) United States Patent
Yoshida

(10) Patent No.: US 7,541,006 B2
(45) Date of Patent: Jun. 2, 2009

(54) HONEYCOMB STRUCTURED BODY

(75) Inventor: Yutaka Yoshida, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 338 days.

(21) Appl. No.: 11/368,401

(22) Filed: Mar. 7, 2006

(65) Prior Publication Data

US 2006/0217262 A1    Sep. 28, 2006

Related U.S. Application Data

(63) Continuation of application No. PCT/JP2004/016442, filed on Nov. 5, 2004.

(30) Foreign Application Priority Data

Nov. 7, 2003  (JP) ............................... 2003-378708

(51) Int. Cl.
*B01D 50/00* (2006.01)
(52) U.S. Cl. ...................................... 422/180
(58) Field of Classification Search ................ 422/168, 422/177, 180; 55/523, 282.2
See application file for complete search history.

(56) References Cited

U.S. PATENT DOCUMENTS

| | | | |
|---|---|---|---|
| 4,416,676 A | | 11/1983 | Montierth |
| 5,106,802 A | * | 4/1992 | Horiuchi et al. ............... 502/65 |
| 5,914,187 A | * | 6/1999 | Naruse et al. ............... 428/327 |
| 5,930,994 A | | 8/1999 | Shimato et al. |
| 6,447,564 B1 | | 9/2002 | Ohno et al. |
| 6,565,630 B2 | | 5/2003 | Ohno et al. |
| 6,669,751 B1 | | 12/2003 | Ohno et al. |
| 6,770,116 B2 | | 8/2004 | Kojima |
| 6,797,666 B2 | | 9/2004 | Harada et al. |
| 6,939,825 B1 | | 9/2005 | Ohno et al. |
| 7,387,657 B2 | * | 6/2008 | Kunieda et al. ............... 55/523 |
| 2002/0029548 A1 | | 3/2002 | Ohno et al. |
| 2002/0178922 A1 | | 12/2002 | Ohno et al. |
| 2003/0019354 A1 | | 1/2003 | Kojima |
| 2004/0018123 A1 | | 1/2004 | Okawara et al. |
| 2004/0031264 A1 | | 2/2004 | Kojima |
| 2004/0033175 A1 | | 2/2004 | Ohno et al. |

(Continued)

FOREIGN PATENT DOCUMENTS

EP          A 0 089 751          9/1983

(Continued)

OTHER PUBLICATIONS

U.S. Appl. No. 10/129,126.

(Continued)

*Primary Examiner*—Tom Duong
(74) *Attorney, Agent, or Firm*—Finnegan, Henderson, Farabow, Garrett & Dunner LLP

(57) ABSTRACT

A honeycomb structured body of the present invention is configured by assembling one or at least two pillar-shaped porous ceramic member in which a number of through holes are longitudinally placed in parallel with one another with a partition wall therebetween, either one of ends of these through holes being sealed, wherein the porous ceramic member is a composite made of ceramic particles and silicon, and a catalyst is supported on the partition wall, and a relationship between an aperture ratio $\alpha$ (%) of the honeycomb structured body and an supported amount $\beta$ (g/L) of the catalyst satisfies the following inequality (1):

$$9.8 - 0.125 \times \alpha \leq \beta \qquad (1).$$

15 Claims, 7 Drawing Sheets

U.S. PATENT DOCUMENTS

| | | |
|---|---|---|
| 2004/0055265 A1 | 3/2004 | Ohno et al. |
| 2004/0161596 A1 | 8/2004 | Taoka et al. |
| 2004/0223892 A1 | 11/2004 | Kojima |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0076626 A1 | 4/2005 | Kudo et al. |
| 2005/0102987 A1 | 5/2005 | Kudo |
| 2005/0109023 A1 | 5/2005 | Kudo et al. |
| 2005/0115224 A1 | 6/2005 | Kojima |
| 2005/0153099 A1 | 7/2005 | Yamada |
| 2005/0159310 A1 | 7/2005 | Ohno et al. |
| 2005/0160710 A1 | 7/2005 | Taoka et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0176581 A1 | 8/2005 | Ohno et al. |
| 2005/0178098 A1 | 8/2005 | Ono et al. |
| 2005/0180898 A1 | 8/2005 | Yamada |
| 2005/0214504 A1 | 9/2005 | Yoshida |
| 2005/0229565 A1 | 10/2005 | Yoshida |
| 2005/0235621 A1 | 10/2005 | Kunieda et al. |
| 2005/0247038 A1 | 11/2005 | Takahashi |
| 2006/0288678 A1 | 12/2006 | Yoshida |

FOREIGN PATENT DOCUMENTS

| | | |
|---|---|---|
| EP | 0 909 579 | 4/1999 |
| EP | 1214973 A1 * | 6/2002 |
| EP | 1 277 714 | 1/2003 |
| EP | 1371826 A2 * | 12/2003 |
| JP | 5068892 | 3/1993 |
| JP | 06293573 A * | 10/1994 |
| JP | 11179158 | 7/1999 |
| JP | 2001137714 | 5/2001 |
| JP | 2002253916 | 9/2002 |
| JP | 2004019498 | 1/2004 |
| JP | 2004076717 | 3/2004 |
| WO | WO 00/01463 | 1/2000 |
| WO | WO 02/96827 | 5/2002 |

OTHER PUBLICATIONS

U.S. Appl. No. 10/502,044.
U.S. Appl. No. 10/515,179.
U.S. Appl. No. 10/515,181.
U.S. Appl. No. 10/516,328.
U.S. Appl. No. 10/518,548.
U.S. Appl. No. 10/521,592.
U.S. Appl. No. 10/527,531.
U.S. Appl. No. 10/530,561.
U.S. Appl. No. 11/127,236.
U.S. Appl. No. 11/143,998.
U.S. Appl. No. 11/145,986.
U.S. Appl. No. 11/156,569.
U.S. Appl. No. 11/174,483.
U.S. Appl. No. 11/147,726.
U.S. Appl. No. 11/178,461.
U.S. Appl. No. 11/225,197.
U.S. Appl. No. 11/230,643.
U.S. Appl. No. 11/340,591.
U.S. Appl. No. 11/341,507.
European Patent Office Search Report (Jun. 6, 2006).
European Patent Office Action re EP Patent Appln. No. 04818205.9 dated Dec. 11, 2006.
International Preliminary Report on Patentability (PCT/JP2004/016442).

* cited by examiner

A-A line cross-sectional view

30 Honeycomb structured body
33 Wall portion
31 Through hole
35

31
33
32 Plug

HONEYCOMB STRUCTURED BODY

CROSS-REFERENCE TO RELATED APPLICATIONS

This application is a continuation application of PCT/JP2004/016442 filed on Nov. 5, 2004, which claims priority of JP-A 2003-378708 filed on Nov. 7, 2003. The contents of these applications are incorporated herein by reference in their entirety.

BACKGROUND OF THE INVENTION

1. Field of the Invention

The present invention relates to a honeycomb structured body.

2. Discussion of the Background

It has been a problem in recent years that various substances contained in exhaust gases that are discharged from internal combustion engines of automobiles and the like are harmful to the environment and the human body, and regulations against exhaust gases have been strengthened.

For example, exhaust gases discharged from gasoline engines used in many private cars and the like normally contain HC, CO, NOx and the like. In order to remove these substances, there has been developed an exhaust gas conversion system in which, in an exhaust gas passage, a catalyst supporting member with a three way catalyst supported thereon is installed.

FIG. 6 is a cross-sectional perspective view that schematically shows a catalyst supporting member used in such an exhaust gas conversion system.

As shown in FIG. 6, a catalyst supporting member 70 is a honeycomb structured body made of a porous ceramic in which a large number of through holes 71 are longitudinally placed in parallel with one another with a wall portion 73 therebetween. The three way catalyst is supported on the wall portion 73.

By allowing exhaust gases to flow through these through holes 71 to be made in contact with the three way catalyst, HC and CO in the exhaust gases are oxidized, while NOx is reduced; thus, the exhaust gases are converted.

At this time, only in a narrow range in which the air-fuel ratio of a mixed gas injected into the gasoline engine is kept in the vicinity of the theoretical air-fuel ratio, the three way catalyst exerts a high converting ratio for HC, CO, NOx and the like in exhaust gases; therefore, the air-fuel ratio of the mixed gas injected into the gasoline engine is controlled to be set to the theoretical air-fuel ratio.

However, since a diesel engine used in many large-size transporting means such as buses and trucks burns a fuel in a lean-burn state (excessive oxygen state) at a higher temperature in comparison with the gasoline engine, the content of NOx is comparatively high although the contents of HC and CO in the exhaust gases are smaller in comparison with exhaust gases discharged from gasoline engines, and SOx derived from sulfur contained in light oil serving as the fuel is also contained. Moreover, many particulate substances (particulates) are contained therein to cause a major problem.

FIG. 7 is a partially notched perspective view that schematically shows a honeycomb structured body (honeycomb filter) used for collecting particulates contained in exhaust gases discharged from diesel engines.

As shown in FIG. 7, a honeycomb filter 80 has a honeycomb structure made of a porous ceramic in which a large number of through holes 81 are longitudinally placed in parallel with one another with a wall portion 83 therebetween. Either one of the ends at the inlet side or outlet side of the through hole 81 is sealed with a plug 84 to form a so-called diced pattern; thus, exhaust gases, entered through one through hole 81, are allowed to flow out of another through hole 81 after always passing through the wall portion 83 that separates the through holes 81. When the exhaust gases pass through the wall portion 83, particulates are captured at the wall portion 83, and thus the exhaust gases are purified.

In the honeycomb filter of this type, for elimination by oxidization or reduction of HC, CO, NOx and the like contained in the exhaust gases and also to collect particulates in the exhaust gases, a catalyst for removing these substances is supported.

Moreover, when particulates exceeding a predetermined amount have been collected on the wall portion of the honeycomb filter, the pressure loss becomes so high that the filter is no longer usable; therefore, it is necessary to carry out a regenerating process to regenerate the honeycomb filter by thermally decomposing and removing the collected particulates.

In recent years, in order to carry out the regeneration process of such a honeycomb filter at low energy with high efficiency, there has been used a method in which a catalyst for oxidization-removing particulates is supported on the wall portions of the honeycomb filter.

Normally, the burning temperature of the particulates (soot) is in the range of about 550° C. to about 630° C.; however, by supporting the catalyst for oxidization-removing the particulates on the wall portions of the honeycomb filter, the burning temperature of the particulates can be lowered through its catalytic function.

With respect to the honeycomb filter in which the catalyst of this type is supported, there is a well known filter in which, for example, a supporting layer made of γ-alumina is formed on the surface of each of filtering walls (cell walls) of a heat-resistant supporting member formed by molding cordierite or the like into a honeycomb filter as shown in FIG. 7, and on the supporting layer, a catalyst active component including noble metal such as Pt, Pd, Rh or the like is further supported (hereinafter, also referred to as supporting method (1)).

With respect to the supporting layer, a layer has been proposed in which: fine powder, obtained by adding an inorganic binder to γ-alumina and pulverizing the mixture, is formed into a slurry, and a so-called wash-coating process in which this slurry is uniformly sprayed on the wall face of a honeycomb supporting member made of cordierite, is carried out so that an alumina layer is formed (for example, see JP-A 05-68892).

As indicated by JP-A 2001-137714, the present inventors have developed a technique in which each of particles forming a porous ceramic supporting member has its surface coated with an alumina thin film, with a catalytic active component being supported on the irregular surface of the alumina thin film (hereinafter, also referred to as supporting method (2)).

The contents of JP-A 05-68892 and JP-A 2001-137714 are incorporated herein by reference in their entirety.

SUMMARY OF THE INVENTION

The present invention provides a honeycomb structured body configured by assembling one or at least two pillar-shaped porous ceramic member in which a number of through holes are longitudinally placed in parallel with one another with a partition wall therebetween, either one of ends of these through holes being sealed, wherein the porous ceramic member is a composite made of ceramic particles and silicon, and a catalyst is supported on the partition wall, and a relationship between an aperture ratio α (%) of the honeycomb structured body and a supported amount β (g/L) of the catalyst satisfies the following inequality (1):

$$9.8-0.125\times\alpha \leq \beta \quad (1).$$

According to the present invention, it is desirable that the relationship between the aperture ratio α (%) of the honeycomb structured body and the supported amount β (g/L) of catalyst satisfies the following inequality (2):

$$13-0.125\times\alpha \geq \beta \quad (2).$$

Further, the lower limit value of the aperture ratio α (%) of the honeycomb structured body is desirably about 40%, more desirably about 45%, and still more desirably about 50%.

According to the present invention, it is desirable that a catalyst-supporting material layer is formed on a surface of the partition wall and the catalyst is supported on the catalyst-supporting material layer, or a catalyst-supporting material layer is formed on a surface of a particulate constituting the partition wall and the catalyst is supported on the catalyst-supporting material layer.

Further, it is desirable the catalyst-supporting material layer comprises γ-alumina, and the catalyst supported on the partition wall comprises at least one selected from the group consisting of Pt, Rh, Pd, Ce, Cu, V, Fe, Au and Ag.

According to the present invention, it is desirable that the honeycomb structured body has a porosity of about 20% to about 80%, and an average pore diameter of about 5 to about 100 μm.

The honeycomb structured body according to the present invention desirably comprises a plurality of pillar-shaped porous ceramic members in which a number of through holes are longitudinally placed in parallel with one another with a partition wall therebetween, either one of ends of these through holes being sealed, are bound to one another through a sealing material layer. The sealing material layer is desirably made of a material comprising inorganic fibers and/or inorganic particles in addition to an inorganic binder and an organic binder.

The composite desirably comprises porous ceramic in which ceramic particles are bonded to one another through silicon, and the ceramic particles desirably comprise silicon carbide.

DESCRIPTION OF THE EMBODIMENTS

Figure 1:
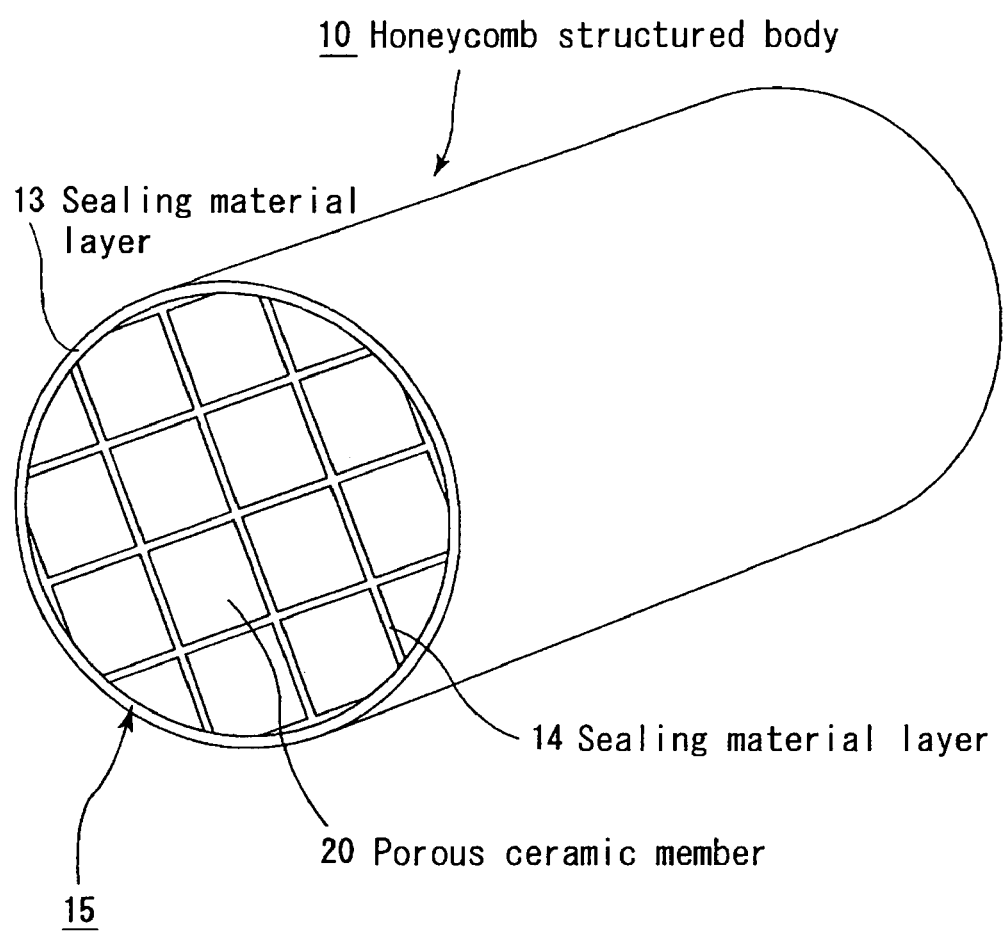
FIG. 1 is a perspective view that schematically shows one example of a filter for purifying exhaust gases according to the present invention.

The present invention provides a honeycomb structured body configured by assembling one or at least two pillar-shaped porous ceramic member in which a number of through holes are longitudinally placed in parallel with one another with a partition wall therebetween, either one of ends of these through holes being sealed, wherein the porous ceramic member is a composite made of ceramic particles and silicon, and a catalyst is supported on the partition wall, and a relationship between an aperture ratio α (%) of the honeycomb structured body and a supported amount β (g/L) of the catalyst satisfies the following inequality (1):

$$9.8-0.125\times\alpha \leq \beta \quad (1).$$

In the present invention, the term "aperture ratio of a honeycomb structured body" refers to a ratio of a cross-sectional area of through holes to the cross-sectional area of the honeycomb structured body in the direction perpendicular to the longitudinal direction thereof (direction perpendicular to the longitudinal direction of the through hole). The honeycomb structured body of the present invention, which is used as a general filter for purifying exhaust gases (for collecting particulates), is configured by three kinds of members, that is, partition walls, through holes and sealing portions. Therefore, the aperture ratio of the present invention corresponds to a ratio of the sum of areas of the through holes and the sealing portions (a value obtained by subtracting the sum of the area of the partition walls from the cross-sectional area of the filter) to the cross-sectional area of the honeycomb structured body.

Therefore, even in the case where the sealed portions at the two ends are not in the state of almost equal to each other (for example, the numbers of the sealed portions at the two ends are made different from each other, or the cross sectional shapes of the through hole are changed on the two sides), the ratio is calculated by using the above-mentioned method without taking the sealed shapes into consideration.

In the case where the honeycomb shape is expanded in the longitudinal direction into a tapered shape, the average of cross-sectional area in the longitudinal direction is desirably used for the calculations.

Here, in the case where sealing material layers are formed in the honeycomb structured body, the portion occupied by the sealing material layers is not contained in the cross-sectional area of the honeycomb structured body.

The honeycomb structured body of the present invention has a structure in which one or at least two pillar-shaped porous ceramic member in which a large number of through holes longitudinally placed in parallel with one another with a wall portion therebetween are assembled with one another with a catalyst supported on the wall portion.

The honeycomb structured body may have a structure in which a plurality of pillar-shaped porous ceramic members, each including a plurality of through holes longitudinally placed in parallel with one another with a partition wall therebetween, are bound to one another through sealing material layers to be combined into an assembled body (hereinafter, also referred to as "assembled-type honeycomb structured body"), or may be prepared as a porous ceramic member that is formed into a single member as a whole (hereinafter, also referred to as "integral-type honeycomb structured body").

In the case where the honeycomb structured body of the present invention is prepared as the assembled-type honeycomb structured body, each wall portion include a partition wall that separates the through holes of the porous ceramic member, an outer wall of the porous ceramic member and a sealing material layer that functions as an adhesive layer between the porous ceramic members, and each partition wall of the porous ceramic members is allowed to function as a filter for collecting particles. In other words, a part of the partition wall functions as the filter for collecting particles.

On the contrary, in the case where the honeycomb structured body of the present invention is prepared as the integral-type honeycomb structured body, the wall portion is formed by the partition wall of only one kind, so that the entire wall portion is allowed to function as a filter for collecting particles.

Figure 2A:
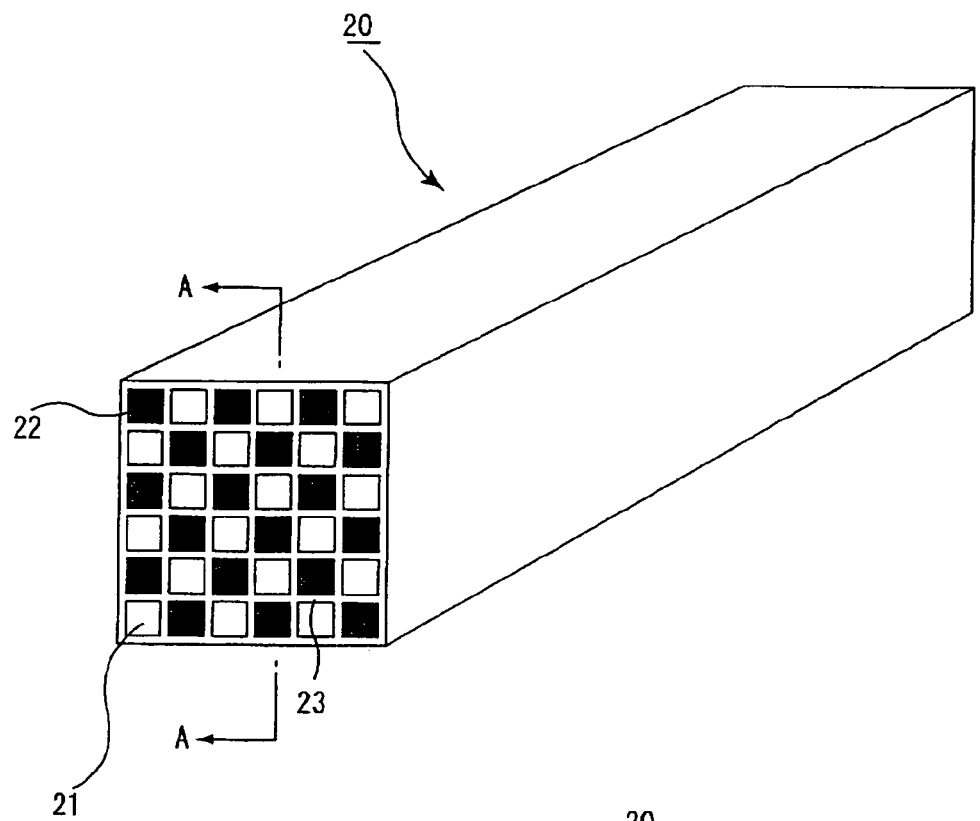
FIG. 2A is a perspective view that schematically shows one example of a porous ceramic member that forms a honeycomb structured body for purifying exhaust gases shown in FIG. 1.
Figure 2B:
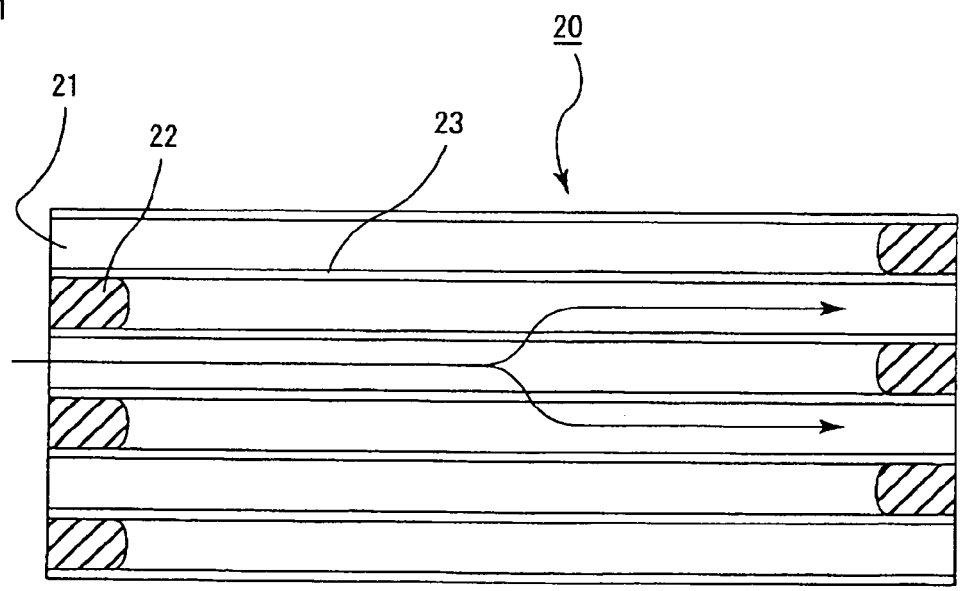
FIG. 2B is a cross-sectional view taken along line A-A of the porous ceramic member shown in FIG. 2A.

FIG. 1 is a perspective view that schematically shows a specific example of the assembled-type honeycomb structured body that is one example of the honeycomb structured body of the present invention, FIG. 2A is a perspective view that schematically shows one example of the porous ceramic member forming the assembled-type honeycomb structured body shown in FIG. 1, and FIG. 2B is a cross sectional view of the porous ceramic member taken along line A-A of FIG. 2A.

As shown in FIGS. 1 and 2, this assembled-type honeycomb structured body 10 has a structure in which a plurality of porous ceramic members 20 are bound to one another through sealing material layers 14 to form a ceramic block 15, and a sealing material layer 13 is formed on the periphery of the ceramic block 15 so as to prevent leak of exhaust gases.

Moreover, as shown in FIG. 2B, in the porous ceramic member 20, either one of the ends at the inlet side or outlet side of the through hole 21 is sealed with a plug 22, so that exhaust gases entered through one through hole 21 are allowed to flow out of another through hole 21 after always passing through the partition wall 23 that separates the through holes 21; thus, the partition wall 23 that separates the through holes 21 is allowed to function as a filter for collecting particles.

In the assembled-type honeycomb structured body 10 of the present invention, a catalyst is applied to the partition wall 23 through a catalyst-supporting material layer which is not shown in the figure.

Figure 3A:
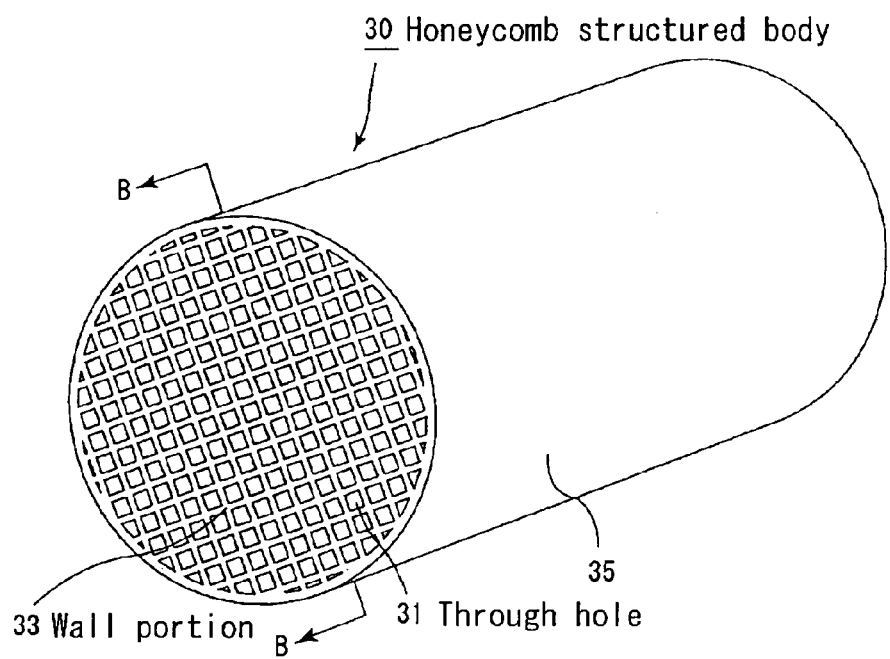
FIG. 3A is a perspective view that schematically shows another example of a honeycomb structured body for purifying exhaust gases according to the present invention.
Figure 3B:
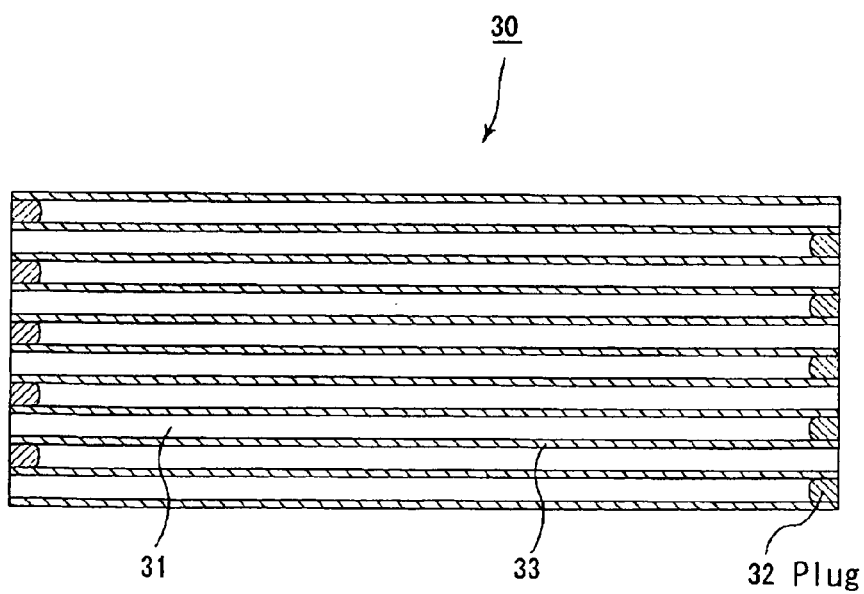
FIG. 3B is a cross-sectional view taken along line B-B of the honeycomb structured body shown in FIG. 3A.

FIG. 3A is a perspective view that schematically shows a specific example of an integral-type honeycomb structured body, which is another example of the honeycomb structured body of the present invention, and FIG. 3B is a sectional view taken along line B-B of FIG. 3A.

As shown in FIG. 3A, the integral-type honeycomb structured body 30 forms a ceramic block 35 made of a single porous ceramic member in which a large number of through holes 31 are longitudinally placed in parallel with one another with a wall portion 33 therebetween, and all the wall portions 33 are allowed to function as filters for collecting particles.

In other words, as shown in FIG. 3B, the through holes 31, formed in the integral-type honeycomb structured body 30, are configured so that either one of the ends at the exhaust gas inlet side or outlet side of each through hole 31 is sealed with a plug 32 and exhaust gases entered through one through hole 31 are allowed to flow out of another through hole 31 after always passing through the wall portion 33 that separates the through holes 31.

Thus, particulates contained in exhaust gases flowing into the integral-type honeycomb structured body 30 of the present invention are captured at the wall portions 33 when passing through the wall portions 33, so that the exhaust gases are purified.

Moreover, in the integral-type honeycomb structured body 30 of the present invention, a catalyst is applied to the partition wall 33 through a catalyst-supporting material layer which is not shown in the figure.

Furthermore, although not shown in FIG. 3A, a sealing material layer may be formed on the periphery of the ceramic block 35 in the same manner as the assembled-type honeycomb structured body 10 shown in FIG. 1.

In the honeycomb structured body of the present invention, with respect to the method of supporting the catalyst on the wall portion of the honeycomb structured body, either the above-mentioned supporting method (1) or supporting method (2) may be used.

With respect to particulates contained in exhaust gases that are captured at the wall portion, there are two cases depending on the porosity and pore diameter of the wall portion: a case in which particulates are accumulated on the surface of the wall portion, and a case in which particulates penetrate to the inside of the wall portion, and the honeycomb structured body of the present invention is applied to either of the cases.

Here, in the honeycomb structured body of the present invention, in the case where the supporting method (1) is used as the method of supporting the catalyst on the wall portion, particulates in exhaust gases to be captured at the wall portion are desirably accumulated on the surface of the wall portion. Since the supporting method (1) is a method in which the catalyst-supporting material layer is formed on the surface of the wall portion with the catalyst being supported on the catalyst-supporting material layer, it is difficult for the catalyst to oxidize and purify (convert) particulates penetrated to the inside of the wall portion.

In contrast, in the case where the supporting method (2) is used as the method of supporting the catalyst on the wall portion, particulates in exhaust gases to be captured at the wall portion are desirably allowed to penetrate to the inside of the wall portion. Since the supporting method (2) is a method in which each particle forming the wall portion is coated with the catalyst-supporting material layer, while the catalyst is supported on the surface with irregularities of the catalyst-supporting material layer, it is possible to preferably oxidize and purify (convert) particulates penetrated to the inside of the wall portion.

The method of oxidization-purifying (oxidization-converting) of particulates captured at the wall portion of the honeycomb structured body of the present invention using a catalyst supported on the wall portion is not particularly limited, and includes, for example, a method in which, when a predetermined amount of particulates are accumulated and the pressure loss in the honeycomb structured body becomes high, the honeycomb structured body is heated by a heating means such as a heater and the like or by post-injection, to a temperature at which the catalyst is allowed to function, so that the particulates are oxidization-purified (oxidization-converted) (hereinafter, also referred to as regenerating method (1)); and a method such as a DPNR (Diesel Particulate-NOx Reduction System) developed by Toyota Motor Corporation, in which oxidizing and purifying (converting) operations are allowed to carry out frequently on particulates captured at the wall portion, by utilizing active oxygen generated upon reduction of NOx in exhaust gases (hereinafter, also referred to as regenerating method (2)).

In the honeycomb structured body of the present invention, upon carrying out the regenerating process on the honeycomb structured body by using the regenerating method (1), the supporting method used for supporting the catalyst on the wall portion is the above-mentioned supporting method (1) and particulates are desirably accumulated only on the surface of the wall portion.

In the regenerating method (1), the regenerating process is carried out after a certain amount of particulates have been accumulated; therefore, in the case where the particulates are allowed to penetrate to the inside of the wall portion, the amount of particulates to be accumulated before carrying out the regenerating process becomes too much, and as a result, the particulates are accumulated also on the surface of the wall portion. When the regenerating process of the honeycomb structured body is carried out in this state, most of the particulates to be oxidization-purified (oxidization-converted) are limited to those particulates accumulated on the surface of the wall portion, and as a result, those particulates accumulated inside the wall portion are hardly oxidization-purified (oxidization-converted); therefore, almost only the catalyst on the surface of the wall portion is in substantial use.

In contrast, upon carrying out the regenerating process on the honeycomb structured body by using the regenerating method (2), the supporting method used for supporting the catalyst on the wall portion is the above-mentioned supporting method (2) so that particulates are desirably allowed to penetrate to the inside of the wall portion.

Since the regenerating method (2) makes it possible to readily oxidization-purify (oxidization-convert) the particulates accumulated inside the wall portion, the catalyst supported inside of the wall portion as well as on the surface thereof can be utilized effectively.

Of course, upon using the supporting method (2), the regenerating method (1) can also be sufficiently applied, if the oxidizing process is carried out before the inside of the wall portion is filled with particulates, and thus the regenerating conditions can be changed.

The honeycomb structured body of the present invention is characterized in that it is a composite of ceramic particles and silicon.

The present inventors have found that by using the composite of ceramic particles and silicon upon manufacturing the honeycomb structured body, the purifying of exhaust gases is improved, and as a result of further research efforts, they have found an optimal range between the aperture ratio α (%) of the honeycomb structured body and the supported amount β (g/L) of catalyst on the wall portion, thereby completing the present invention.

In general, ceramics of two types, that is, those of a covalent bond type and those of an ionic bond type, exist. In the covalent bond type and the ionic bond type thereof, it is rare for a charge to be transferred. However, silicon is a substance in which a charge is transferred freely, compared with the above-mentioned ceramics. Consequently, when silicon and noble metal (Pt or the like) are located closely to each other, transfer of a charge tends to happen smoothly in the noble metal so that the noble metal is allowed to have a charge more easily in comparison with a normal catalyst supporting member made of only ceramics to consequently activate gases and the like more easily.

As for the activating of gases and the like, for example, NOx contained in exhaust gases can be made into a gaseous activating agent in a low temperature range (from around 250° C. to 500° C.). In other words, NO in exhaust gases is oxidized, and made into $NO_2$ that has a high oxidizing property. In a reducing atmosphere, $NO_2$ has a very high activity, and it is considered that its gaseous activating agent accelerates oxidization of the particulates.

In comparison with oxygen that has not been activated, activated oxygen easily reacts with particulates so as to be oxidized at a low temperature. For this reason, the activated oxygen accelerates the oxidization of the particulates.

As described above, it has been found that the property for purifying exhaust gases by silicon is improved by using the composite of ceramic particles and silicon, and after extensive research efforts, the following optimal range is obtained.

In the honeycomb structured body of the present invention, the aperture ratio α (%) of the honeycomb structured body and the supported amount β (g/L) of catalyst satisfy a relationship indicated by the following inequality (1).

$$9.8-0.125 \times \alpha \leq \beta \tag{1}$$

In the honeycomb structured body of the present invention, the required supported amount β of catalyst varies depending on the aperture ratio α of the honeycomb structured body, and according to the above-mentioned inequality (1), in the case where the aperture ratio α of the honeycomb structured body is low, the lower limit value of the amount of supported catalyst β becomes greater, while in the case where the aperture ratio α of the honeycomb structured body is high, the lower limit value of the amount of supported catalyst β becomes smaller.

When the aperture ratio α of the honeycomb structured body is low, the rate of wall portions that account for the cross section perpendicular to the longitudinal direction of the honeycomb structured body becomes higher. More specifically, the aperture ratio becomes lower in the following cases: (1) the thickness of the wall is increased; (2) the number of through holes is made greater, with the cross section of the through holes being made smaller.

However, the above-mentioned conditions are not so preferable to be applied since these conditions basically make the pressure loss higher.

In the above-mentioned cases (1) and (2), in order to reduce the pressure loss, it is necessary to improve the degree of pores of the filter (to make the porosity greater). In the case where the degree of pores of the filter is improved, since particulates are allowed to penetrate to the inside of the wall portion, it becomes necessary to support a catalyst also in the deep-layer portion of the wall portion. This makes it necessary to increase the amount of a catalyst.

When the aperture ratio α of the honeycomb structured body is high, the rate of wall portions that account for the cross section perpendicular to the longitudinal direction of the honeycomb structured body becomes smaller. More specifically, the aperture ratio becomes higher in the following cases: (3) the thickness of the wall is reduced; (4) the number of through holes is made smaller, with the cross section of the through holes being made greater.

However, the above-mentioned conditions are not so preferably applied since these conditions cause a reduction in the strength.

In the above-mentioned cases (3) and (4), in order to increase the strength, it is necessary to reduce the degree of pores of the filter, with the porosity being made smaller. In the case where the porosity of the filter is reduced, particulates are accumulated only on the surface of the wall portion. Consequently, it is necessary to support a catalyst only on the surface of the wall portion so that the amount of catalyst can be reduced.

Figure 4:
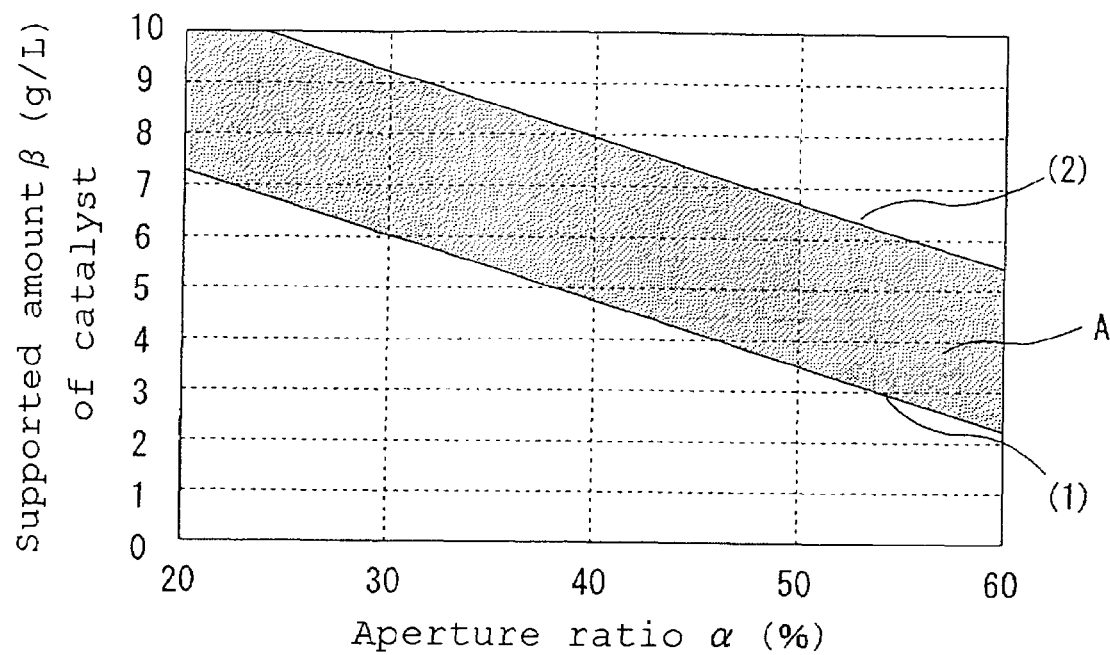
FIG. 4 is a graph that shows a relationship between an aperture ratio α of a ceramic block and an amount of supported catalyst in the honeycomb structured body for purifying exhaust gases according to the present invention.

FIG. 4 is a graph that indicates a relationship between the aperture ratio α (%) of the honeycomb structured body and the supported amount β (g/L) of catalyst in the honeycomb structured body of the present invention.

In other words, the above-mentioned inequality (1) indicates an area on the upper side of a straight line (1) shown in FIG. 4, and in the honeycomb structured body of the present invention, the aperture ratio α and the amount of supported catalyst β correspond to any values located in the area on the upper side of the straight line (1).

More specifically, in the case where the aperture ratio α of the honeycomb structured body is about 40%, the supported amount β of catalyst becomes about 4.8 g/L or more; in the case where the aperture ratio of the honeycomb structured body is about 50%, the supported amount β of catalyst becomes about 3.55 g/L or more; and in the case where the aperture ratio of the honeycomb structured body is about 60%, the supported amount β of catalyst becomes about 2.3 g/L or more.

Moreover, in the honeycomb structured body of the present invention, the aperture ratio α (%) of the honeycomb structured body and the supported amount β (g/L) of catalyst desirably satisfy a relationship indicated by the following inequality (2).

$$13-0.125 \times \alpha \geq \beta \qquad (2)$$

In the honeycomb structured body of the present invention, as indicated by the above-mentioned inequality (2), when the aperture ratio α of the honeycomb structured body is low, the preferable upper limit value of the supported amount β of catalyst becomes greater, and when the aperture ratio α of the honeycomb structured body is high, the preferable upper limit value of the supported amount β of catalyst becomes smaller.

In the honeycomb structured body of the present invention, the supported amount β of catalyst is required to satisfy the relationship of the above-mentioned inequality (1), and in the case where the supported amount β of catalyst becomes too high with respect to the aperture ratio α of the honeycomb structured body, the distance between catalyst particles becomes closer, with the result that sintering of the catalyst takes place too early; therefore, the aperture ratio α of the honeycomb structured body and the supported amount β of catalyst are desirably made to satisfy the relationship indicated by the above-mentioned inequality (2).

The above-mentioned inequality (2) indicates an area on the lower side of a straight line (2) shown in FIG. 4, and in the honeycomb structured body of the present invention, the aperture ratio α and the supported amount β of catalyst are desirably set to any values located in an area A lying between the straight line (1) and the straight line (2).

More specifically, in the case where the aperture ratio α of the honeycomb structured body is about 40%, the supported amount β of catalyst is desirably set to about 8.0 g/L or less; in the case where the aperture ratio of the honeycomb structured body is about 50%, the supported amount of catalyst is desirably set to about 6.75 g/L or less; and in the case where the aperture ratio of the honeycomb structured body is about 60%, the supported amount β of catalyst is desirably set to about 5.5 g/L or less.

With respect to the method of reducing the aperture ratio of the honeycomb structured body, a method of increasing the thickness of the wall portion and a method of increasing the cell density are proposed. In these cases, the pressure loss in an exhaust gas purifying device using the honeycomb structured body of the present invention tends to become higher, and the strength also tends to become higher.

Here, the above-mentioned "cell density" refers to the number of through holes located within a predetermined area (for example, one inch$^2$) on a cross section perpendicular to the longitudinal direction of the honeycomb structured body.

In the case where the catalyst supporting method of the honeycomb structured body of the present invention is the supporting method (1) while the regenerating method of the honeycomb structured body is the regenerating method (1), the method used for reducing the aperture ratio of the honeycomb structured body is desirably the method of increasing the cell density. When the cell density of the honeycomb structured body of the present invention is increased, the inner wall of each through hole, that is, the area of wall portions (filtration permissible area), becomes larger to increase the reaction sites between particulates accumulated on the surface of the wall portion and the catalyst, thereby enabling the regenerating process of the honeycomb structured body of the present invention to be carried out efficiently.

Moreover, in the case where the catalyst supporting method of the honeycomb structured body of the present invention is the supporting method (2) while the regenerating method of the honeycomb structured body is the regenerating method (2), the method used for reducing the aperture ratio of the honeycomb structured body is desirably the method of increasing the thickness of the wall portion. When the thickness of the wall portion of the honeycomb structured body of the present invention is increased, the reaction sites between particulates accumulated inside the wall portion and the catalyst increase, thereby enabling the regenerating process of the honeycomb structured body of the present invention to be carried out efficiently.

Here, with respect to the method of increasing the aperture ratio of the honeycomb structured body, a method of reducing the thickness of the wall portion and a method of reducing the cell density are proposed. In these cases, the pressure loss in an exhaust gas purifying device using the honeycomb structured body of the present invention tends to become lower, and the strength also tends to become lower.

In the case where the catalyst supporting method of the honeycomb structured body of the present invention is the supporting method (1) while the regenerating method of the honeycomb structured body is the regenerating method (1), the method used for increasing the aperture ratio of the honeycomb structured body is desirably the method of reducing the thickness of the wall portion. When the thickness of the wall portion of the honeycomb structured body of the present invention is reduced, the inner wall of each through hole, that is, the area of wall portions (filtration permissible area), becomes larger to increase the reaction sites between particulates accumulated on the surface of the wall portion and the catalyst, thereby enabling the regenerating process of the honeycomb structured body of the present invention to be carried out efficiently.

Moreover, in the case where the catalyst supporting method of the honeycomb structured body of the present invention is the supporting method (2) while the regenerating method of the honeycomb structured body is the regenerating method (2), the method used for increasing the aperture ratio of the honeycomb structured body is desirably the method of reducing the cell density. When the cell density of the honeycomb structured body of the present invention is reduced, the reaction sites between particulates accumulated inside the wall portion and the catalyst increase, thereby enabling the regenerating process of the honeycomb structured body of the present invention to be carried out efficiently.

In the honeycomb structured body of the present invention, the lower limit value of the aperture ratio α of the honeycomb structured body is desirably set to about 40%. When the lower limit value of the aperture ratio α is less than about 40%, the pressure loss becomes too high or the strength becomes too low. Moreover, the contact possibility with silicon decreases. At this time, in accordance with the above-mentioned inequality (1), the supported amount β of catalyst becomes about 4.8 g/L or more.

The lower limit value of the aperture ratio α is desirably set to about 45%, more desirably, to about 50%. At this time, the supported amount β of catalyst is desirably set to about 4.18 g/L or more, more desirably, to about 3.55 g/L or more, in accordance with the above-mentioned inequality (1).

The catalyst to be supported on the wall portion in the honeycomb structured body of the present invention is not particularly limited, and examples thereof include noble metals such as Pt, Rh, Pd, Ce, Cu, V, Fe, Au and Ag. Among these, Pt is desirably used. Each of the noble metals and the like may be used alone, or two or more kinds thereof may be used in combination. These catalysts can convert HC and CO contained in exhaust gases.

The material for a catalyst-supporting material layer to be used upon supporting the catalyst is not particularly limited, and examples thereof include alumina, titania and the like. Among these, alumina is desirably used.

Moreover, in addition to the above-mentioned catalyst, for example, a catalyst such as alkali metal, alkali earth metal and the like may be supported on the honeycomb structured body of the present invention as long as it is within a range that does not impair the objective of the present invention. Thus, the honeycomb structured body of the present invention makes it possible to convert NOx contained in exhaust gases.

With respect to the honeycomb structured bodies of the present invention as shown in FIGS. 1 and 3, the shape thereof is a cylindrical shape; however, the honeycomb structured body of the present invention is not limited to the cylindrical shape as long as it has a pillar shape, and any desired shape, such as an cylindroid shape and a rectangular pillar shape, may be used.

In the honeycomb structured body of the present invention, the ceramic particles forming the honeycomb structured body is not particularly limited, and examples thereof include: nitride ceramics such as aluminum nitride, silicon nitride, boron nitride and titanium nitride; and carbide ceramics such as silicon carbide, zirconium carbide, titanium carbide, tantalum carbide and tungsten carbide. Among these, silicon carbide, which has high heat resistance, is superior in mechanical properties and also has a high thermal conductivity, is desirably used.

Although not particularly limited, the porosity of the honeycomb structured body is desirably set in the range of about 20% to about 80%. When the porosity is equal to or larger than about 20%, the honeycomb structured body of the present invention is less susceptible to clogging. When the porosity is equal to or less than about 80%, the strength of the honeycomb structured body does not deteriorate easily, and the honeycomb structured body does not break easily.

Here, the above-mentioned porosity can be measured through known methods, such as a mercury press-in method, Archimedes method and a measuring method using a scanning electronic microscope (SEM).

The average pore diameter of the honeycomb structured body is desirably set in the range of about 5 to about 100 μm. When the average pore diameter is about 5 μm or more, it is less likely that particulates clog the pore. On the other hand, when the average pore diameter is about 100 μm or less, particulates do not pass through the pores easily; thus, the particulates can be surely collected, so that the honeycomb structured body can satisfactorily function as a filter.

The average particle size of ceramic particles forming the honeycomb structured body is desirably set in the range of about 1 to about 100 μm. Silicon is interpolated between these ceramic particles in a manner so as to bond the ceramic particles to one another.

With respect to the weight ratio between the ceramic particles and silicon, the weight of silicon is desirably set in the range of about 5 to about 100 parts by weight with respect to 100 parts by weight of the ceramic particles.

The plug with which the through hole of the honeycomb structured body is sealed desirably made from porous ceramics.

In the honeycomb structured body of the present invention, since the honeycomb structured body sealed with the plugs is made from porous ceramics, by forming the plugs by the use of the same porous ceramic material as the honeycomb structured body, the adhesion strength of the two members is increased, while the coefficient of thermal expansion of the honeycomb structured body is made well-matched with the coefficient of thermal expansion of the plug by adjusting the porosity of the plugs in the same manner as that of the honeycomb structured body. Therefore, it becomes possible to prevent a gap from occurring between the plug and the wall portion due to a thermal stress exerted upon production and during use and to prevent cracks from occurring in the plug and in a wall portion contacting to the plug.

In the case where the plug is made from porous ceramics, although the material thereof is not particularly limited, for example, the same material as the ceramic material forming the honeycomb structured body may be used.

When the honeycomb structured body of the present invention is an assembled-type filter as shown in FIG. 1, the sealing material layers 13 and 14 are formed between the porous ceramic members 20 and on the periphery of the ceramic block 15. Here, the sealing material layer 14 formed between the porous ceramic members 20 also functions as an adhesive used for binding the porous ceramic members 20 to one another. On the other hand, the sealing material layer 13 formed on the periphery of the ceramic block 15 has a function for preventing leak of exhaust gases from the periphery of the ceramic block 15, when the honeycomb structured body 10 of the present invention is placed in the exhaust passage of an internal combustion system.

With respect to the material forming the sealing material layer, examples thereof are not particularly limited and may include a material comprising inorganic fibers and/or inorganic particles in addition to an inorganic binder and an organic binder.

As described above, in the honeycomb structured body of the present invention, the sealing material layer is formed between the porous ceramic members and on the periphery of the ceramic block; and these sealing material layers may be made from the same material or different materials. In the case where the same material is used for the sealing material layers, the blending ratio of the material may be the same or different.

With respect to the inorganic binder, for example, silica sol, alumina sol and the like may be used. Each of these may be used alone or two or more kinds thereof may be used in combination. Among the inorganic binders, silica sol is desirably used.

With respect to the organic binder, examples thereof may include polyvinyl alcohol, methyl cellulose, ethyl cellulose, carboxymethyl cellulose and the like. Each of these may be used alone or two or more kinds thereof may be used in combination. Among the organic binders, carboxymethyl cellulose is desirably used.

With respect to the inorganic fibers, examples thereof may include ceramic fibers such as silica-alumina, mullite, alumina, silica and the like. Each of these may be used alone or two or more kinds thereof may be used in combination. Among the inorganic fibers, silica-alumina fibers are desirably used.

With respect to the inorganic particles, examples thereof may include carbides, nitrides and the like, and specific examples may include inorganic powder, whiskers and the like comprising silicon carbide, silicon nitride, boron nitride and the like. Each of these may be used alone, or two or more kinds thereof may be used in combination. Among the inorganic particles, silicon carbide having an excellent thermal conductivity is desirably used.

The sealing material layer 14 may be made from a dense material or may be made from a porous material so as to allow exhaust gases to flow therein.

The honeycomb structured body of the present invention is configured so that the relationship between the aperture ratio $\alpha$ (%) of the honeycomb structured body and the supported amount $\beta$ (g/L) of catalyst satisfies the above-mentioned inequality (1). This arrangement indicates that the catalyst required for oxidization-removing of particulates accumulated on the wall portion is sufficiently supported, and when a regenerating process is carried out on this honeycomb structured body, it becomes possible to obtain a superior regenerating rate.

According to the present invention, by paying attention to the facts that the regenerating rate of the collected particulates is closely related to the aperture ratio of a honeycomb filter for purifying exhaust gases and the amount of supported catalyst and that silicon is also closely related to a catalyst used for converting exhaust gases, the regenerating rate of a honeycomb filter has been improved by setting the aperture ratio of the honeycomb filter and the amount of supported catalyst to a predetermined range, as well as by forming a composite using silicon.

When the supporting method (2) is employed in the present invention, it possible to prevent gaps generated between each of particles constituting the porous ceramic supporting member from being plugged, so that the pores are maintained as they are, thereby pressure loss is suppressed and regenerating rate is increased.

Next, the following description will discuss one example of a manufacturing method for the above-mentioned honeycomb structured body of the present invention.

In order to manufacture the honeycomb structured body of the present invention, first, a ceramic block on which a catalyst is supported through a catalyst-supporting material layer is manufactured.

In the case where the honeycomb structured body of the present invention is an integral-type filter, as shown in FIG. 3A, in which the entire structure is made of a single sintered body, first, an extrusion-molding process is carried out by using a material paste mainly composed of ceramic powder made from the above-mentioned ceramics and silicon powder so that a ceramic formed body having approximately the same shape as the integral-type honeycomb structured body 30 shown in FIG. 3A is manufactured.

The material paste is not particularly limited as long as the porosity of the ceramic block after the manufacturing process is set in the range of about 20% to about 80%, and, for example, a material paste prepared by adding a binder and a dispersant solution to the above-mentioned ceramic powder and silicon powder may be used.

The above-mentioned binder is not particularly limited, and examples thereof may include methyl cellulose, carboxymethyl cellulose, hydroxyethyl cellulose, polyethylene glycol, phenol resins, epoxy resins and the like.

Normally, the blend ratio of the above-mentioned binder is desirably about 1 to about 10 parts by weight to 100 parts by weight of ceramic powder.

The above-mentioned dispersant solution is not particularly limited, and, for example, an organic solvent such as benzene, alcohol such as methanol, water and the like may be used.

An appropriate amount of the above-mentioned dispersant solution is blended so that the viscosity of the material paste is set in a predetermined range.

These ceramic powder, silicon powder, binder and dispersant solution are mixed with an attritor or the like, and sufficiently kneaded with a kneader or the like, and then extrusion-molded so that the above-mentioned ceramic molded body is formed.

Moreover, a molding auxiliary may be added to the above-mentioned material paste, if necessary.

The molding auxiliary is not particularly limited, and examples thereof may include ethylene glycol, dextrin, fatty acid, fatty acid soap, polyalcohol and the like.

Furthermore, a pore-forming agent, such as balloons that are fine hollow spheres composed of oxide-based ceramics, spherical acrylic particles and graphite, may be added to the above-mentioned material paste, if necessary.

The above-mentioned balloons are not particularly limited and, for example, alumina balloons, glass micro-balloons, shirasu balloons, fly ash balloons (FA balloons), mullite balloons and the like may be used. Among these, fly ash balloons are more desirably used.

Next, the above-mentioned ceramic molded body is dried by using a dryer, such as a microwave dryer, a hot-air dryer, a dielectric dryer, a decompression dryer, a vacuum dryer and a freeze dryer, and predetermined through holes are then filled with a plug paste that forms a plug; thereafter, the above-mentioned through holes are subjected to sealing processes so as to be sealed.

The plug paste is not particularly limited, and any may be used as long as the resulting plug manufactured through post processes is allowed to have a porosity in the range of about 20% to about 80%, and, for example, the same material as the above-mentioned material paste may be used; however, a material which is prepared by adding a lubricant, a solvent, a dispersant and a binder to the ceramic powder that is used for the material paste is desirably used. This material makes it possible to prevent the ceramic particles in the plug paste from precipitating in the middle of the sealing process.

Next, the ceramic dried body sealed with the plug paste is subjected to a degreasing process under predetermined conditions and to firing processes at a firing temperature in the range of 1400 to 1650° C., so that a ceramic block that is made of porous ceramics, and constituted by a single sintered body as a whole is manufactured.

Here, with respect to degreasing and sintering conditions and the like of the ceramic dried body, conditions that are conventionally used for manufacturing a honeycomb structured body made of porous ceramics can be applied.

In the case where the honeycomb structured body of the present invention has a structure of an assembled-type filter in which a plurality of porous ceramic members are combined with one another through sealing material layers, as shown in FIG. 1, first, an extrusion-molding process is carried out by using a material paste mainly composed of ceramic powder and silicon powder as described earlier so that a raw molded body, which has a shape corresponding to the porous ceramic member 20 shown in FIG. 2A, is formed.

Here, with respect to the above-mentioned material paste, the same material paste as explained in the integral-type filter may be used.

Next, the above-mentioned raw molded body is dried by using a microwave dryer or the like to form a dried body, and predetermined through holes are then sealed with plug paste that forms plugs; thereafter, the above-mentioned through holes are subjected to sealing processes so as to be sealed.

Here, the plug paste may be the same paste as the plug paste explained in the integral-type filter, and with respect to the sealing processes, the same method as the above-mentioned integral-type filter may be used, except that the subject the plug paste to be sealed is different.

Next, the dried body that has been subjected to the sealing processes is subjected to degreasing and sintering processes under the same conditions as those of the integral-type filter so that a porous ceramic member having a structure in which a plurality of through holes are placed longitudinally in parallel with one another with a partition wall therebetween is manufactured.

Next, sealing material paste, which forms a sealing material layer 14, is applied to side faces of the porous ceramic member with an even thickness so that a sealing material paste layer is formed, and a process in which another porous ceramic member 20 is successively laminated on this sealing material paste layer is repeated so that a piled-up body of a square-pillar shaped porous ceramic member 20 having a predetermined size is manufactured.

Here, with respect to the material used for forming the sealing material paste, the same materials as described in the honeycomb structured body of the present invention may be used; therefore, description thereof is omitted.

Next, the piled-up body of this porous ceramic member 20 is heated so that the sealing material paste layer is dried and solidified to form a sealing material layer 14, and the peripheral portion of this is then cut into a shape as shown in FIG. 1 by using, for example, a diamond cutter and the like so that a ceramic block in which a plurality of porous ceramic members are combined with one another through sealing material layers is manufactured.

Then, a sealing material layer 13 is formed on the periphery of the ceramic block by using the sealing material paste.

Each of the ceramic blocks manufactured in this manner has a pillar shape, and their structures are as shown in FIGS. 1 and 3.

Next, on each of the wall portions of the ceramic block manufactured through the above-mentioned method, a catalyst is supported through a catalyst-supporting material layer.

Since the material for the catalyst-supporting material layer has been explained in the description of the above-mentioned honeycomb structured body of the present invention, explanation thereof is omitted. The following description will exemplify a case in which alumina is used as a material for the above-mentioned catalyst-supporting material layer.

In the case where the catalyst is supported on each of the wall portions of the ceramic block by using the aforementioned supporting method (1), first, an inorganic binder is added to alumina to be mixed therein, and the mixture is pulverized to form fine powder.

Examples of the alumina include γ-alumina, and this γ-alumina is prepared by using a sol-gel method or the like.

Moreover, the inorganic binder is not particularly limited and examples thereof include alumina hydrate and the like.

Next, the above-mentioned fine powder is mixed with pure water, and stirred by using a stirrer and the like so that slurry is prepared (slurry preparation process).

Moreover, the slurry is sprayed on the ceramic block (slurry spray process) or the ceramic block is immersed in the slurry so that a so-called wash coating process is carried out (immersing and coating process); thus, the slurry is allowed to adhere to the surface of the wall portions of the ceramic block.

The ceramic block, wash-coated with the slurry, is dried and fired at a predetermined temperature so that a catalyst-supporting material layer is formed on the surface of the wall portions of the ceramic block (drying and firing process).

In the case where the catalyst is supported on the wall portions of the ceramic block through the above-mentioned supporting method (2), first, a solution of an aluminum-containing metal compound, which forms a catalyst-supporting material layer, is prepared (solution preparation process).

Examples of the material for the aluminum-containing metal compound include metal compounds such as metal inorganic compounds, metal organic compounds and the like.

With respect to the metal inorganic compounds, examples thereof include: $Al(NO_3)_3$, $AlCl_3$, $AlOCl$, $AlPO_4$, $Al_2(SO_4)_3$, $Al_2O_3$, $Al(OH)_3$ and the like, and among these, $Al(NO_3)_3$ and $AlCl_3$, which are easily dissolved in a solvent such as alcohol and water, and easily handled, are desirably used.

With respect to the metal organic compounds, examples thereof include: metal alkoxides, metal acetyl acetonates, metal carboxylates and the like.

Specific examples thereof include $Al(OCH_3)_3$, $Al(OC_2H_3)_3$, $Al(iso-OC_3H_7)_3$ and the like.

With respect to the solvent, examples thereof include: water, alcohol, diol, polyhydric alcohol, ethylene glycol, ethylene oxide, triethanol amine and xylene. At least one or more kinds of these solvents are properly mixed and applied by taking dissolution of the above-mentioned metal compound into consideration.

Moreover, upon preparing the above-mentioned solution, a catalyst, such as hydrochloric acid, sulfuric acid, nitric acid, acetic acid and hydrofluoric acid, may be added thereto. Moreover, in order to improve the heat resistance of alumina, a simple substance such as Li, K, Ca, Sr, Ba, La, Pr, Nd, Si and Zr or a compound thereof, may be added together with the above-mentioned metal compound.

Next, the wall portions of the ceramic block are impregnated with a solution of the aluminum-containing metal compound (impregnating process).

At this time, in order to direct the solution to all the pores that are gaps between the respective ceramic particles of the wall portion of the ceramic block, for example, a method to degas the ceramic block by putting it into a container with the container filled with the solution, and a method in which the solution is poured from one side of the ceramic block so as to carry out a degassing process on the other side, may be used.

With respect to the degassing device, for example, an aspirator, a vacuum pump or the like is used.

Next, the ceramic block is heated at a temperature in the range of about 120° C. to about 170° C. for about 2 hours so that the solution is removed through evaporation to form a gel which is fixed on the surface of ceramic particles and excessive solution is removed; thereafter the resulting ceramic block is heated at a temperature about 300° C. to about 500° C. so that it is temporarily fired (heating and pre-firing process).

This is then subjected to a hot-water treatment at a temperature in the range of about 50° C. to about 100° C. for about one hour or more (hot-water treatment process).

By carrying out this hot-water treatment, an alumina thin film, formed on the surface of ceramic particles, makes a small fiber state (needle-state particles) with the fibers standing in parallel with one another so that a thin film having a so-called hair transplantation structure with a roughened surface is formed.

Then, this is fired under conditions of a temperature from about 500° C. to about 1000° C. for about 5 to about 20 hours so that a catalyst-supporting material layer is formed on the wall portions of the ceramic block (firing process).

Next, a catalyst is supported on the catalyst-supporting material layer formed through either of the above-mentioned methods so that the honeycomb structured body of the present invention is manufactured.

The lower limit value of the amount of the supported catalyst on the catalyst-supporting material layer is calculated by assigning an aperture ratio $\alpha$ of the ceramic block to the aforementioned inequality (1), and the upper limit value is desirably set to a value that is not more than the value obtained by assigning the aperture ratio $\alpha$ of the ceramic block to the aforementioned inequality (2).

The method of supporting the catalyst is not particularly limited and examples thereof may include an impregnation method, an evaporation drying method, a balanced adsorption method, an incipient-wetness method, a spray method and the like.

Figure 5:
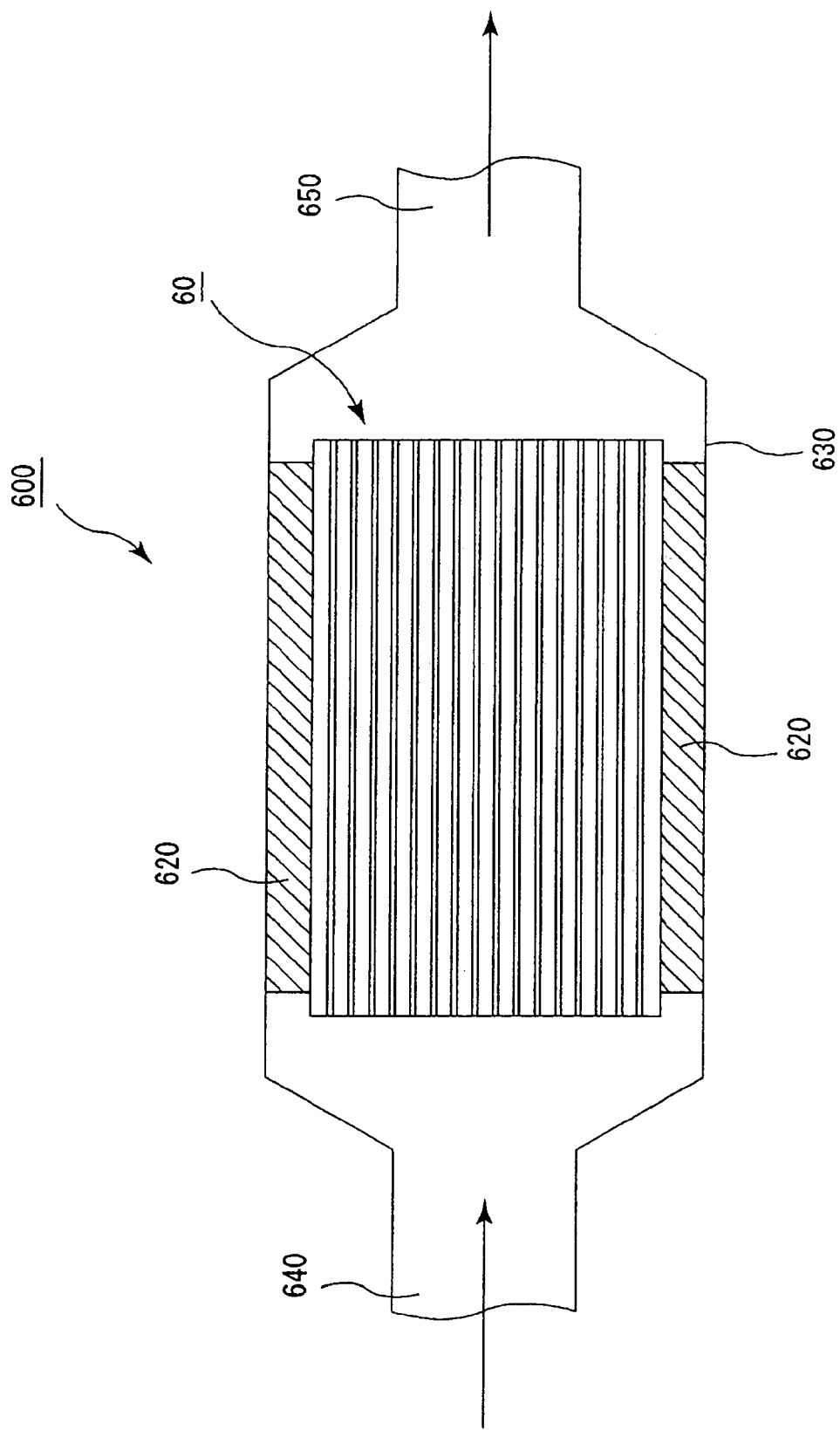
FIG. 5 is a cross-sectional view that schematically shows one example of an exhaust gas purifying device in which the honeycomb structured body for purifying exhaust gases according to the present invention is used.
Figure 6:
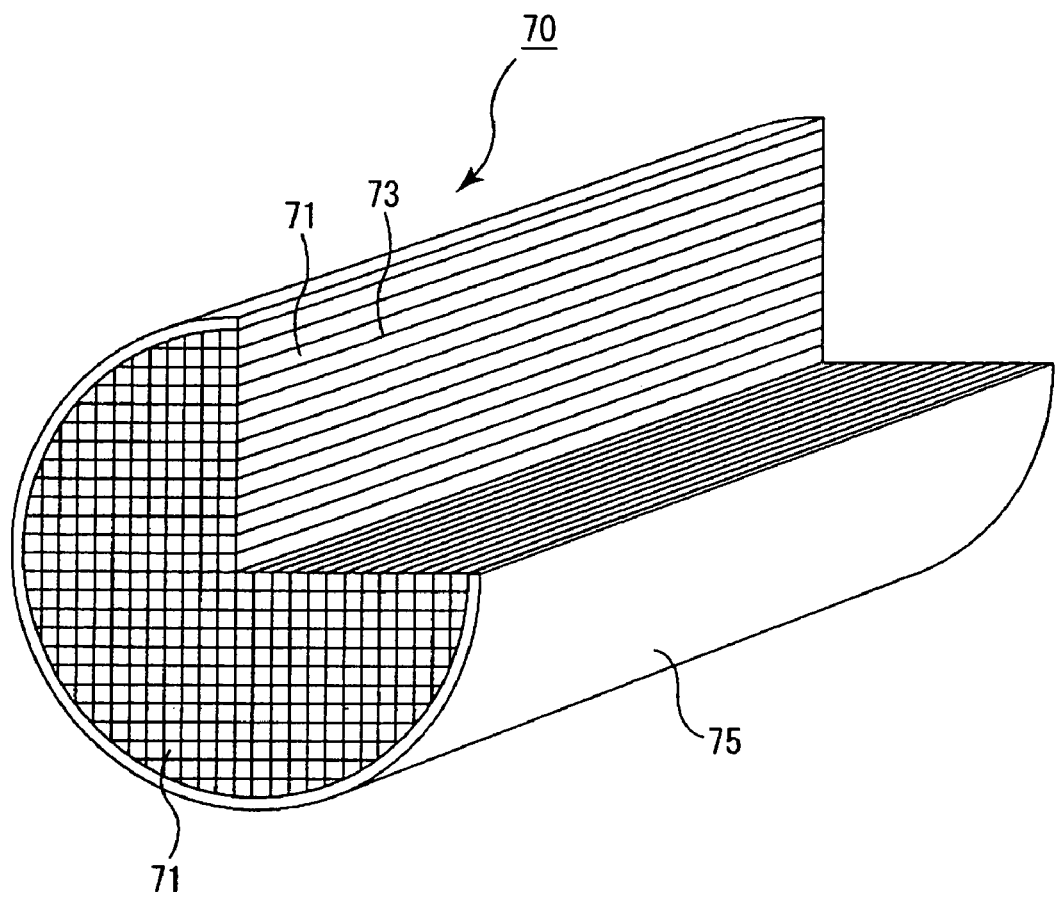
FIG. 6 is a cross-sectional perspective view that schematically shows one example of a catalyst supporting member used in a conventional exhaust gas purifying system.
Figure 7:
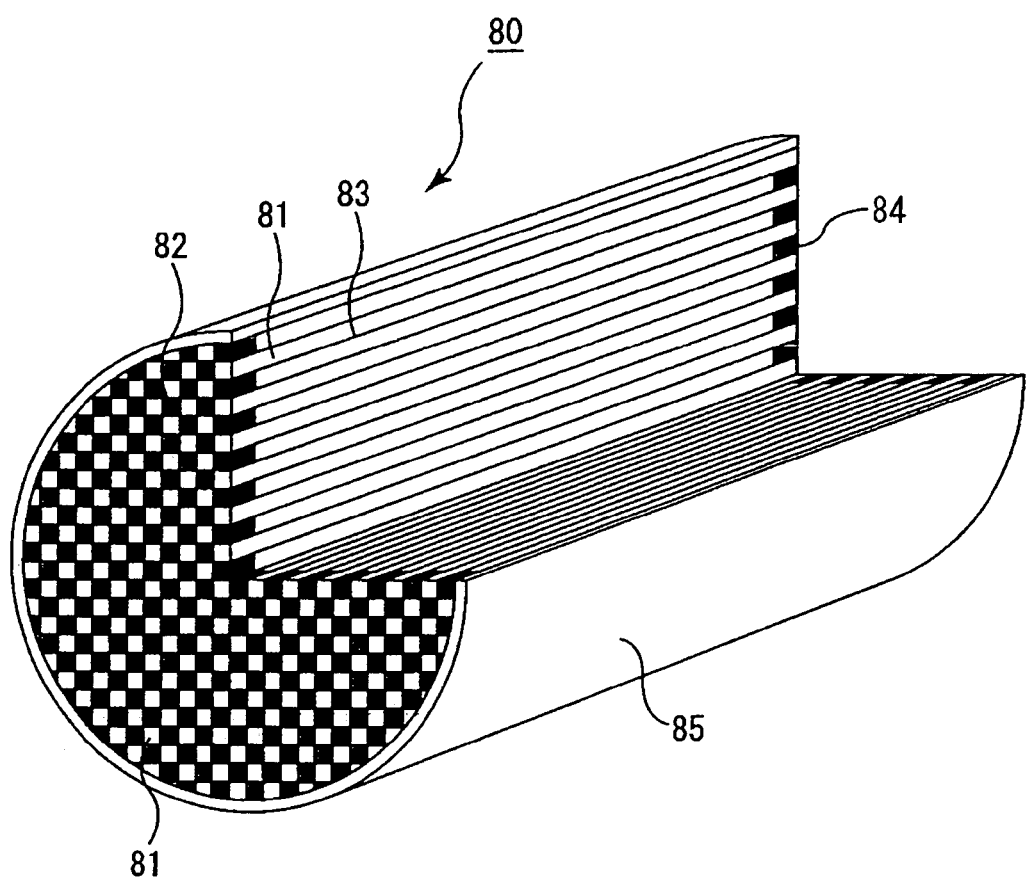
FIG. 7 is a cross-sectional perspective view that schematically shows one example of a conventional honeycomb structured body for purifying exhaust gases.

FIG. 5 is a cross-sectional view that schematically shows one example of an exhaust gas purifying device for a vehicle in which the honeycomb structured body of the present invention is installed.

As shown in FIG. 5, an exhaust gas purifying device 600 is mainly configured by a honeycomb structured body 60 of the present invention, a casing 630 that covers the outside of the honeycomb structured body 60, and a holding sealing material 620 placed between the honeycomb structured body 60 and the casing 630, and an introducing pipe 640 coupled to an internal combustion system such as an engine is connected to the end portion of the casing 630 on the side to which exhaust gases are introduced, with an exhaust pipe 650 coupled to the outside being connected to the other end portion of the casing 630. In FIG. 5, arrows indicate flows of exhaust gases.

Here, in FIG. 5, the honeycomb structured body 60 may be prepared as the honeycomb structured body 10 shown in FIG. 1, or as the honeycomb structured body 30 shown in FIG. 3A.

In the exhaust gas purifying device 600 having the above-mentioned configuration, exhaust gases, discharged from an internal combustion system such as an engine, are introduced into the casing 630 through the introducing pipe 640, and allowed to pass through a wall portion (partition wall) from the through hole of the honeycomb structured body 60 so that, after particulates therein have been collected through this wall portion (partition wall) to purify the exhaust gases, the resulting exhaust gases are discharged outside through the exhaust pipe 650.

Here, the particulates that have been collected by the wall portion (partition wall) of the honeycomb structured body 60 are oxidized and removed through the aforementioned regenerating method (1) or regenerating method (2) so that a regenerating process of the honeycomb structured body 60 is carried out.

As described above, in the honeycomb structured body of the present invention, the aperture ratio $\alpha$ of a ceramic block forming the honeycomb structured body and the supported amount $\beta$ of catalyst are allowed to satisfy a relationship indicated by the aforementioned inequality (1) so that a catalyst required for oxidizing and removing particulates deposited on the wall portion is sufficiently supported on the wall portion, and when the honeycomb structured body is subjected to a regenerating process, the regenerating rate is remarkably improved.

EXAMPLES

In the following, the present invention will be described further in detail by way of examples; however, the present invention is not intended to be limited by only these examples.

Examples 1 to 4, Comparative Example 1

(1) Powder of $\alpha$-type silicon carbide having an average particle size of 30 μm (80 parts by weight) and metal silicon having an average particle size of 5 μm (20 parts by weight) were wet-mixed, and to 100 parts by weight of the resulting mixture were added and kneaded 5 parts by weight of an organic binder (methyl cellulose) and 10 parts by weight of water to prepare a mixed composition. After a slight amount of a plasticizer and a lubricant had been added to the mixed composition and this had been further kneaded, the resulting mixed composition was extrusion-molded so that a raw molded product having almost the same shape as the porous ceramic member 20 shown in FIG. 2A was manufactured.

Next, the above-mentioned raw molded product was dried by using a microwave drier to form a ceramic dried body, and predetermined through holes were then filled with a paste having the same composition as the raw molded product, and after having been again dried by using a drier, this was degreased at 400° C., and fired at 1450° C. in a normal-pressure argon atmosphere for one hour to manufacture a porous ceramic member, which was made of a composite material between silicon carbide particles and silicon, and had a size of 34.3 mm×34.3 mm×150.5 mm, a porosity of 50%, an average pore diameter of 20 μm, a cell density of 198 cells/inch$^2$ and a thickness of the partition wall of 0.43 mm.

(2) A heat resistant sealing material paste, which contained 30% by weight of alumina fibers having a fiber length of 20 μm, 21% by weight of silicon carbide particles having an average particle size of 0.6 μm, 15% by weight of silica sol, 5.6% by weight of carboxymethyl cellulose and 28.4% by weight of water, was used so that, by carrying out the aforementioned manufacturing method of a piled-up body of porous ceramic members, a number of the porous ceramic members were combined with one another to form a piled-up body with a thickness of 1.0 mm in the sealing material layers used for combining the porous ceramic members; and the piled-up body was cut by using a diamond cutter to prepare a cylindrical ceramic block having a diameter of 144 mm.

Next, 23.3% by weight of ceramic fibers made from alumina silicate (shot content: 3%, fiber length: 5 to 100 μm), which served as inorganic fibers, 30.2% by weight of silicon carbide powder having an average particle size of 0.3 μm, which served as inorganic particles, 7% by weight of silica sol (SiO$_2$ content in the sol: 30% by weight), which served as an inorganic binder, 0.5% by weight of carboxymethyl cellulose, which served as an organic binder, and 39% by weight of water were mixed and kneaded to prepare a sealing material paste.

Next, a sealing material paste layer having a thickness of 1.0 mm was formed on the peripheral portion of the ceramic block by using the above-mentioned sealing material paste.

Further, this sealing material paste layer was dried at 120° C. so that a sealing material layer was formed on the periphery of the ceramic block.

The resulting ceramic block had an aperture ratio of 55.9%.

Here, the amount of supported catalyst, calculated by assigning this aperture ratio to the aforementioned inequality (1), was 2.8 g/L or more, and the amount of supported catalyst, calculated by assigning this aperture ratio to the aforementioned inequality (2), was 6.0 g/L or less.

(3) Next, γ-alumina was formed on the wall portions (partition walls) of the above-mentioned ceramic block as a catalyst-supporting material layer, by using the method explained as the supporting method (2) in the aforementioned embodiments, and platinum was supported on the catalyst-supporting material layer through an incipient-wetness method.

Here, the amounts of supported platinum were 3.0 g/L (Example 1), 4.4 g/L (Example 2), 6.0 g/L (Example 3), 6.3 g/L (Example 4) and 2.6 g/L (Comparative Example 1).

Examples 5 to 8, Comparative Example 2

(1) The same processes as those of (1) in Example 1 were carried out except that the cell density of the porous ceramic member was set to 316 cells/inch$^2$ and that the thickness of the partition wall was set to 0.36 mm so that a porous ceramic member was manufactured.

(2) The same processes as those of (2) in Example 1 were carried out so that a ceramic block with a sealing material layer formed on the periphery thereof was manufactured. The resulting ceramic block had an aperture ratio of 54.4%.

Here, the amount of supported catalyst, calculated by assigning this aperture ratio to the aforementioned inequality (1), was 3.0 g/L or more, and the amount of supported catalyst, calculated by assigning this aperture ratio to the aforementioned inequality (2), was 6.2 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 3.0 g/L (Example 5), 4.4 g/L (Example 6), 6.0 g/L (Example 7), 6.3 g/L (Example 8) and 2.6 g/L (Comparative Example 2).

Examples 9 to 12, Comparative Example 3

(1) The same processes as those of (1) in Example 1 were carried out except that the cell density of the porous ceramic member was set to 430 cells/inch$^2$ and that the thickness of each partition wall was set to 0.31 mm so that a porous ceramic member was manufactured.

(2) The same processes as those of (2) in Example 1 were carried out so that a ceramic block, with a sealing material layer being formed on the periphery thereof, was manufactured. The resulting ceramic block had an aperture ratio of 55.1%.

Here, the amount of supported catalyst, calculated by assigning this aperture ratio to the aforementioned inequality (1), was 2.9 g/L or more, and the amount of supported catalyst, calculated by assigning this aperture ratio to the aforementioned inequality (2), was 6.1 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 3.0 g/L (Example 9), 4.4 g/L (Example 10), 6.0 g/L (Example 11), 6.3 g/L (Example 12) and 2.6 g/L (Comparative Example 3).

Examples 13 to 16, Comparative Example 4

(1) The same processes as those of (1) in Example 1 were carried out except that the cell density of the porous ceramic member was set to 967 cells/inch$^2$ and that the thickness of the partition wall was set to 0.20 mm so that a porous ceramic member was manufactured.

(2) The same processes as those of (2) in Example 1 were carried out so that a ceramic block, with a sealing material layer being formed on the periphery thereof, was manufactured. The resulting ceramic block had an aperture ratio of 55.8%.

Here, the amount of supported catalyst, calculated by assigning this aperture ratio to the aforementioned inequality (1), was 2.8 g/L or more, and the amount of supported catalyst, calculated by assigning this aperture ratio to the aforementioned inequality (2), was 6.0 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 3.0 g/L (Example 13), 4.4 g/L (Example 14), 6.0 g/L (Example 15), 6.3 g/L (Example 16) and 2.6 g/L (Comparative Example 4).

Examples 17 to 20, Comparative Example 5

(1) The same processes as those of (1) in Example 1 were carried out except that the cell density of the porous ceramic member was set to 123 cells/inch$^2$ so that a porous ceramic member was manufactured. Here, the thickness of each partition wall was 0.43 mm.

(2) The same processes as those in (2) of Example 1 were carried out so that a ceramic block, with a sealing material layer being formed on the periphery thereof, was manufactured. The resulting ceramic block had an aperture ratio of 63.7%.

Here, the amount of supported catalyst, calculated by assigning this aperture ratio to the aforementioned inequality (1), was 1.8 g/L or more, and the amount of supported catalyst, calculated by assigning this aperture ratio to the aforementioned inequality (2), was 5.0 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 2.0 g/L (Example 17), 3.4 g/L (Example 18), 5.0 g/L (Example 19), 5.3 g/L (Example 20) and 1.7 g/L (Comparative Example 5).

Examples 21 to 24, Comparative Example 6

(1) The same processes as those of (1) in Example 5 were carried out except that the cell density of the porous ceramic member was set to 198 cells/inch$^2$ so that a porous ceramic member was manufactured. Here, the thickness of each partition wall was 0.36 mm.

(2) The same processes as those of (2) in Example 1 were carried out so that a ceramic block, with a sealing material layer being formed on the periphery thereof, was manufactured. The resulting ceramic block had an aperture ratio of 62.4%.

Here, the amount of supported catalyst, calculated by assigning this aperture ratio to the aforementioned inequality (1), was 2.0 g/L or more, and the amount of supported catalyst, calculated by assigning this aperture ratio to the aforementioned inequality (2), was 5.2 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 2.0 g/L (Example 21), 3.4 g/L (Example 22), 5.0 g/L (Example 23), 5.3 g/L (Example 24) and 1.7 g/L (Comparative Example 6).

Examples 25 to 28, Comparative Example 7

(1) The same processes as those of (1) in Example 9 were carried out except that the cell density of the porous ceramic member was set to 265 cells/inch$^2$ so that a porous ceramic member was manufactured. Here, the thickness of each partition wall was 0.31 mm.

(2) The same processes as those of (2) in Example 1 were carried out so that a ceramic block, with a sealing material layer being formed on the periphery thereof, was manufactured. The resulting ceramic block had an aperture ratio of 63.3%.

Here, the amount of supported catalyst, calculated by assigning this aperture ratio to the aforementioned inequality (1), was 1.9 g/L or more, and the amount of supported catalyst, calculated by assigning this aperture ratio to the aforementioned inequality (2), was 5.1 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 2.0 g/L (Example 25), 3.4 g/L (Example 26), 5.0 g/L (Example 27), 5.3 g/L (Example 28) and 1.7 g/L (Comparative Example 7).

Examples 29 to 32, Comparative Example 8

(1) The same processes as those of (1) in Example 13 were carried out except that the cell density of the porous ceramic member was set to 634 cells/inch$^2$ so that a porous ceramic member was manufactured. Here, the thickness of each partition wall was 0.20 mm.

(2) The same processes as those of (2) in Example 1 were carried out so that a ceramic block, with a sealing material layer being formed on the periphery thereof, was manufactured. The resulting ceramic block had an aperture ratio of 63.0%.

Here, the amount of supported catalyst, calculated by assigning this aperture ratio to the aforementioned inequality (1), was 1.9 g/L or more, and the amount of supported catalyst, calculated by assigning this aperture ratio to the aforementioned inequality (2), was 5.1 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 2.0 g/L (Example 29), 3.4 g/L (Example 30), 5.0 g/L (Example 31), 5.3 g/L (Example 32) and 1.7 g/L (Comparative Example 8).

Examples 33 to 36, Comparative Example 9

(1) The same processes as those of (1) in Example 1 were carried out except that the cell density of the porous ceramic member was set to 55 cells/inch$^2$ so that a porous ceramic member was manufactured. Here, the thickness of each partition wall was 0.43 mm.

(2) The same processes as those of (2) in Example 1 were carried out so that a ceramic block, with a sealing material layer being formed on the periphery thereof, was manufactured. The resulting ceramic block had an aperture ratio of 74.2%.

Here, the amount of supported catalyst, calculated by assigning this aperture ratio to the aforementioned inequality (1), was 0.53 g/L or more, and the amount of supported catalyst, calculated by assigning this aperture ratio to the aforementioned inequality (2), was 3.73 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 0.55 g/L (Example 33), 2.15 g/L (Example 34), 3.60 g/L (Example 35), 4.00 g/L (Example 36) and 0.40 g/L (Comparative Example 9).

Examples 37 to 40, Comparative Example 10

(1) The same processes as those of (1) in Example 5 were carried out except that the cell density of the porous ceramic member was set to 79 cells/inch$^2$ so that a porous ceramic member was manufactured. Here, the thickness of each partition wall was 0.36 mm.

(2) The same processes as those of (2) in Example 1 were carried out so that a ceramic block, with a sealing material layer being formed on the periphery thereof, was manufactured. The resulting ceramic block had an aperture ratio of 74.6%.

Here, the amount of supported catalyst, calculated by assigning this aperture ratio to the aforementioned inequality (1), was 0.48 g/L or more, and the amount of supported catalyst, calculated by assigning this aperture ratio to the aforementioned inequality (2), was 3.68 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 0.55 g/L (Example 37), 2.15 g/L (Example 38), 3.60 g/L (Example 39), 4.00 g/L (Example 40) and 0.40 g/L (Comparative Example 10).

Examples 41 to 44, Comparative Example 11

(1) The same processes as those of (1) in Example 9 were carried out except that the cell density of the porous ceramic member was set to 107 cells/inch$^2$ so that a porous ceramic member was manufactured. Here, the thickness of each partition wall was 0.31 mm.

(2) The same processes as those of (2) in Example 1 were carried out so that a ceramic block, with a sealing material layer being formed on the periphery thereof, was manufactured. The resulting ceramic block had an aperture ratio of 75.1%.

Here, the amount of supported catalyst, calculated by assigning this aperture ratio to the aforementioned inequality (1), was 0.41 g/L or more, and the amount of supported catalyst, calculated by assigning this aperture ratio to the aforementioned inequality (2), was 3.61 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 0.55 g/L (Example 41), 2.15 g/L (Example 42), 3.60 g/L (Example 43), 4.00 g/L (Example 44) and 0.40 g/L (Comparative Example 11).

Examples 45 to 48, Comparative Example 12

(1) The same processes as those of (1) in Example 13 were carried out except that the cell density of the porous ceramic member was set to 265 cells/inch$^2$ so that a porous ceramic member was manufactured. Here, the thickness of each partition wall was 0.20 mm.

(2) The same processes as those of (2) in Example 1 were carried out so that a ceramic block, with a sealing material layer being formed on the periphery thereof, was manufactured. The resulting ceramic block had an aperture ratio of 74.7%.

Here, the amount of supported catalyst, calculated by assigning this aperture ratio to the aforementioned inequality (1), was 0.46 g/L or more, and the amount of supported catalyst, calculated by assigning this aperture ratio to the aforementioned inequality (2), was 3.66 g/L or less.

(3) The same processes as those of (3) in Example 1 were carried out to form a catalyst-supporting material layer, and platinum was supported on the catalyst-supporting material layer to manufacture a cylindrical honeycomb structured body. Here, the amounts of supported platinum were 0.55 g/L (Example 45), 2.15 g/L (Example 46), 3.60 g/L (Example 47), 4.00 g/L (Example 48) and 0.40 g/L (Comparative Example 12).

Each of the honeycomb structured bodies according to Examples 1 to 48 and Comparative Examples 1 to 12 was installed in an exhaust gas purifying device as shown in FIG. 5, and this was placed in an exhaust passage of an engine, and the engine was driven at the number of revolutions of 3000 min$^{-1}$ and a torque of 50 Nm for a predetermined period of time so that particulates were collected; thereafter, regenerating processes in which the honeycomb structured body was heated to 550° C. by using an electric heater so as to be regenerated were repeatedly carried out 20 times, and the presence or absence of residual particulates that had not been burnt was observed. With respect to the observation on the presence or absence of the residual particles that had not been burnt, the honeycomb structured body was cut in a direction perpendicular to the longitudinal direction, and 15 sectional areas were observed by using SEM. Here, with respect to each of the examples and comparative examples, two samples were prepared, and after the completion of the first regenerating process, the samples of all the examples and comparative examples were observed, and with respect to those samples having no residual unburned particulates upon completion of the first regenerating process, those are again observed after the completion of regenerating processes of 20 times.

The results of the tests are shown in the following Tables 1 to 3.

In Tables 1 to 3, those samples that had no residual unburned particulates even after the collecting processes of particulates and regenerating processes of 20 times were indicated by ○, those samples that caused residual unburned particulates in the 20$^{th}$ process were indicated by Δ, and those samples that caused residual unburned particulates in the first process were indicated by X.

TABLE 1

|  | Aperture ratio (%) | Cell density (cell/inch$^2$) | Thickness of partition wall (mm) | Calculated value in inequality (1) (*1) | Calculated value in inequality (2) (*2) | Amount of supported platinum (g/L) | Evaluation |
|---|---|---|---|---|---|---|---|
| Example 1 | 55.9 | 198 | 0.43 | 2.8 | 6.0 | 3.0 | ○ |
| Example 2 | 55.9 | 198 | 0.43 | 2.8 | 6.0 | 4.4 | ○ |
| Example 3 | 55.9 | 198 | 0.43 | 2.8 | 6.0 | 6.0 | ○ |
| Example 4 | 55.9 | 198 | 0.43 | 2.8 | 6.0 | 6.3 | Δ |
| Example 5 | 54.4 | 316 | 0.36 | 3.0 | 6.2 | 3.0 | ○ |
| Example 6 | 54.4 | 316 | 0.36 | 3.0 | 6.2 | 4.4 | ○ |
| Example 7 | 54.4 | 316 | 0.36 | 3.0 | 6.2 | 6.0 | ○ |
| Example 8 | 54.4 | 316 | 0.36 | 3.0 | 6.2 | 6.3 | Δ |
| Example 9 | 55.1 | 430 | 0.31 | 2.9 | 6.1 | 3.0 | ○ |
| Example 10 | 55.1 | 430 | 0.31 | 2.9 | 6.1 | 4.4 | ○ |
| Example 11 | 55.1 | 430 | 0.31 | 2.9 | 6.1 | 6.0 | ○ |
| Example 12 | 55.1 | 430 | 0.31 | 2.9 | 6.1 | 6.3 | Δ |
| Example 13 | 55.8 | 967 | 0.20 | 2.8 | 6.0 | 3.0 | ○ |
| Example 14 | 55.8 | 967 | 0.20 | 2.8 | 6.0 | 4.4 | ○ |
| Example 15 | 55.8 | 967 | 0.20 | 2.8 | 6.0 | 6.0 | ○ |
| Example 16 | 55.8 | 967 | 0.20 | 2.8 | 6.0 | 6.3 | Δ |
| Comparative Example 1 | 55.9 | 198 | 0.43 | 2.8 | 6.0 | 2.6 | X |
| Comparative Example 2 | 54.4 | 316 | 0.36 | 3.0 | 6.2 | 2.6 | X |
| Comparative Example 3 | 55.1 | 430 | 0.31 | 2.9 | 6.1 | 2.6 | X |
| Comparative Example 4 | 55.8 | 967 | 0.20 | 2.8 | 6.0 | 2.6 | X |

(*1): Lower limit value (g/L) of amount of supported catalyst, calculated by assigning the aperture ratio to inequality (1)
(*2): Upper limit value (g/L) of amount of supported catalyst, calculated by assigning the aperture ratio to inequality (2)

TABLE 2

|  | Aperture ratio (%) | Cell density (cell/inch²) | Thickness of partition wall (mm) | Calculated value in inequality (1) (*1) | Calculated value in inequality (2) (*2) | Amount of supported platinum (g/L) | Evaluation |
|---|---|---|---|---|---|---|---|
| Example 17 | 63.7 | 123 | 0.43 | 1.8 | 5.0 | 2.0 | ○ |
| Example 18 | 63.7 | 123 | 0.43 | 1.8 | 5.0 | 3.4 | ○ |
| Example 19 | 63.7 | 123 | 0.43 | 1.8 | 5.0 | 5.0 | ○ |
| Example 20 | 63.7 | 123 | 0.43 | 1.8 | 5.0 | 5.3 | Δ |
| Example 21 | 62.4 | 198 | 0.36 | 2.0 | 5.2 | 2.0 | ○ |
| Example 22 | 62.4 | 198 | 0.36 | 2.0 | 5.2 | 3.4 | ○ |
| Example 23 | 62.4 | 198 | 0.36 | 2.0 | 5.2 | 5.0 | ○ |
| Example 24 | 62.4 | 198 | 0.36 | 2.0 | 5.2 | 5.3 | Δ |
| Example 25 | 63.3 | 265 | 0.31 | 1.9 | 5.1 | 2.0 | ○ |
| Example 26 | 63.3 | 265 | 0.31 | 1.9 | 5.1 | 3.4 | ○ |
| Example 27 | 63.3 | 265 | 0.31 | 1.9 | 5.1 | 5.0 | ○ |
| Example 28 | 63.3 | 265 | 0.31 | 1.9 | 5.1 | 5.3 | Δ |
| Example 29 | 63.0 | 634 | 0.20 | 1.9 | 5.1 | 2.0 | ○ |
| Example 30 | 63.0 | 634 | 0.20 | 1.9 | 5.1 | 3.4 | ○ |
| Example 31 | 63.0 | 634 | 0.20 | 1.9 | 5.1 | 5.0 | ○ |
| Example 32 | 63.0 | 634 | 0.20 | 1.9 | 5.1 | 5.3 | Δ |
| Comparative Example 5 | 63.7 | 123 | 0.43 | 1.8 | 5.0 | 1.7 | X |
| Comparative Example 6 | 62.4 | 198 | 0.36 | 2.0 | 5.2 | 1.7 | X |
| Comparative Example 7 | 63.3 | 265 | 0.31 | 1.9 | 5.1 | 1.7 | X |
| Comparative Example 8 | 63.0 | 634 | 0.20 | 1.9 | 5.1 | 1.7 | X |

(*1): Lower limit value (g/L) of amount of supported catalyst, calculated by assigning the aperture ratio to inequality (1)
(*2): Upper limit value (g/L) of amount of supported catalyst, calculated by assigning the aperture ratio to inequality (2)

TABLE 3

|  | Aperture ratio (%) | Cell density (cell/inch²) | Thickness of partition wall (mm) | Calculated value in inequality (1) (*1) | Calculated value in inequality (2) (*2) | Amount of supported platinum (g/L) | Evaluation |
|---|---|---|---|---|---|---|---|
| Example 33 | 74.2 | 55 | 0.43 | 0.53 | 3.73 | 0.55 | ○ |
| Example 34 | 74.2 | 55 | 0.43 | 0.53 | 3.73 | 2.15 | ○ |
| Example 35 | 74.2 | 55 | 0.43 | 0.53 | 3.73 | 3.60 | ○ |
| Example 36 | 74.2 | 55 | 0.43 | 0.53 | 3.73 | 4.00 | Δ |
| Example 37 | 74.6 | 79 | 0.36 | 0.48 | 3.68 | 0.55 | ○ |
| Example 38 | 74.6 | 79 | 0.36 | 0.48 | 3.68 | 2.15 | ○ |
| Example 39 | 74.6 | 79 | 0.36 | 0.48 | 3.68 | 3.60 | ○ |
| Example 40 | 74.6 | 79 | 0.36 | 0.48 | 3.68 | 4.00 | Δ |
| Example 41 | 75.1 | 107 | 0.31 | 0.41 | 3.61 | 0.55 | ○ |
| Example 42 | 75.1 | 107 | 0.31 | 0.41 | 3.61 | 2.15 | ○ |
| Example 43 | 75.1 | 107 | 0.31 | 0.41 | 3.61 | 3.60 | ○ |
| Example 44 | 75.1 | 107 | 0.31 | 0.41 | 3.61 | 4.00 | Δ |
| Example 45 | 74.7 | 265 | 0.20 | 0.46 | 3.66 | 0.55 | ○ |
| Example 46 | 74.7 | 265 | 0.20 | 0.46 | 3.66 | 2.15 | ○ |
| Example 47 | 74.7 | 265 | 0.20 | 0.46 | 3.66 | 3.60 | ○ |
| Example 48 | 74.7 | 265 | 0.20 | 0.46 | 3.66 | 4.00 | Δ |
| Comparative Example 9 | 74.2 | 55 | 0.43 | 0.53 | 3.73 | 0.40 | X |
| Comparative Example 10 | 74.6 | 79 | 0.36 | 0.48 | 3.68 | 0.40 | X |
| Comparative Example 11 | 75.1 | 107 | 0.31 | 0.41 | 3.61 | 0.40 | X |
| Comparative Example 12 | 74.7 | 265 | 0.20 | 0.46 | 3.66 | 0.40 | X |

(*1): Lower limit value (g/L) of amount of supported catalyst, calculated by assigning the aperture ratio to inequality (1)
(*2): Upper limit value (g/L) of amount of supported catalyst, calculated by assigning the aperture ratio to inequality (2)

As clearly indicated by the results shown in Tables 1 to 3, the honeycomb structured bodies according to Examples 1 to 3, Examples 5 to 7, Examples 9 to 11, Examples 13 to 15, Examples 17 to 19, Examples 21 to 23, Examples 25 to 27, Examples 29 to 31, Examples 33 to 35, Examples 37 to 39, Examples 41 to 43 and Examples 45 to 47 are designed so that the amount of supported platinum satisfies the relationships of the aforementioned inequalities (1) and (2) with respect to the aperture ratio of the ceramic block, and even after the repetitive particulate collecting processes and regenerating processes of 20 times, hardly any residual unburned particulates were observed; thus it was confirmed that each of the resulting honeycomb structured bodies had a superior regeneration rate.

Moreover, in the honeycomb structured bodies according to Example 4, Example 8, Example 12, Example 16, Example 20, Example 24, Example 28, Example 32, Example 36, Example 40, Example 44 and Example 48, although the amount of supported platinum in relation to the aperture ratio of the ceramic block satisfies the relationship of the aforementioned inequality (1), it fails to satisfy the relationship of the aforementioned inequality (2), with the result that after the repetitive particulate collecting processes and regenerating processes of 20 times, residual unburned particulates were observed to cause a comparatively low regeneration rate.

In contrast, in each of the honeycomb structured bodies according to Comparative Examples 1 to 12, the amount of supported platinum in relation to the aperture ratio of the ceramic block fails to satisfy the relationship of the aforementioned inequality (1), with the result that residual unburned particulates were observed even after the particulate collecting process and the regenerating process in the first time, to cause a very low regeneration rate.

What is claimed as new and desired to be secured by Letters Patent of the United States is:

1. A honeycomb structured body configured by assembling one or at least two pillar-shaped porous ceramic member in which a number of through holes are longitudinally placed in parallel with one another with a partition wall therebetween, either one of ends of these through holes being sealed, wherein said porous ceramic member is a composite made of materials comprising ceramic particles and silicon particles, and a catalyst is supported on said partition wall, and a relationship between an aperture ratio $\alpha$ (%) of said honeycomb structured body and a supported amount $\beta$ (g/L) of said catalyst satisfies the following inequality (1):

$$9.8 - 0.125 \times \alpha \leq \beta \quad (1).$$

2. The honeycomb structured body according to claim 1, wherein the relationship between the aperture ratio .alpha. (%) of said honeycomb structured body and the supported amount 13 (g/L) of catalyst satisfies the following inequality (2):

$$13 - 0.125 \times \alpha \geq \beta \quad (2).$$

3. The honeycomb structured body according to claim 1, wherein the aperture ratio $\alpha$ (%) of said honeycomb structured body has a lower limit value of about 40%.

4. The honeycomb structured body according to claim 3, wherein the aperture ratio $\alpha$ (%) of mid honeycomb structured body has a lower limit value of about 45%.

5. The honeycomb structured body according to claim 3, wherein the aperture ratio $\alpha$ (%) of mid honeycomb structured body has a lower limit value of about 50%.

6. The honeycomb structured body according to claim 1, wherein a catalyst-supporting material layer is formed on a surface of said partition wall and the catalyst is supported on mid catalyst-supporting material layer.

7. The honeycomb structured body according to claim 1, wherein a catalyst-supporting material layer is formed on a surface of a particulate constituting said partition wall and the catalyst is supported on said catalyst-supporting material layer.

8. The honeycomb structured body according to claim 6 or 7, wherein mid catalyst-supporting material layer comprises y-alumina.

9. The honeycomb structured body according to claim 1, wherein the catalyst comprises at least one selected from the group consisting of Pt, Rh, Pd, Ce, Cu, V, Fe, Au and Ag.

10. The honeycomb structured body according to claim 1, wherein said honeycomb structured body has a porosity of about 20% to about 80%.

11. The honeycomb structured body according to claim 1, wherein said honeycomb structured body has an average pore diameter of about 5 to about 100 μm.

12. The honeycomb structured body according to claim 1, wherein said honeycomb structured body comprises a plurality of pillar-shaped porous ceramic members in which a number of through holes are longitudinally placed in parallel with one another with a partition wall therebetween, either one of ends of these through holes being sealed, are bound to one another through a sealing material layer.

13. The honeycomb structured body according to claim 12, wherein said sealing material layer is made of a material comprising inorganic fibers and/or inorganic particles in addition to an inorganic binder and an organic binder.

14. The honeycomb structured body according to claim 1, wherein said composite comprises porous ceramic in which ceramic particles are bonded to one another through silicon.

15. The honeycomb structured body according to claim 14, wherein said ceramic particles comprise silicon carbide.

* * * * *

UNITED STATES PATENT AND TRADEMARK OFFICE
CERTIFICATE OF CORRECTION

PATENT NO. : 7,541,006 B2
APPLICATION NO. : 11/368401
DATED : June 2, 2009
INVENTOR(S) : Yutaka Yoshida It is certified that error appears in the above-identified patent and that said Letters Patent is hereby corrected as shown below:

Claim 2, col. 27, line 36, ".alpha. (%)" should read -- α (%) --.

Claim 2, col. 27, line 38, "13 (g/L)" should read -- β (g/L) --.

Claim 5, col. 28, line 5, "mid honeycomb" should read -- said honeycomb --.

Claim 8, col. 28, line 17, "mid catalyst" should read -- said catalyst --.

Claim 8, col. 28, line 18, "y-alumina" should read -- γ-alumina --.

Signed and Sealed this

Eleventh Day of August, 2009

David J. Kappos
*Director of the United States Patent and Trademark Office*

UNITED STATES PATENT AND TRADEMARK OFFICE
CERTIFICATE OF CORRECTION

PATENT NO. : 7,541,006 B2
APPLICATION NO. : 11/368401
DATED : June 2, 2009
INVENTOR(S) : Yutaka Yoshida Page 1 of 1

It is certified that error appears in the above-identified patent and that said Letters Patent is hereby corrected as shown below:

Claim 4, col. 28, line 2, "of mid honeycomb structured" should read
--of said honeycomb structured--

Claim 6, col. 28, line 10, "mid catalyst-supporting material layer" should read
--said catalyst-supporting material layer--

Signed and Sealed this

Third Day of November, 2009

David J. Kappos
*Director of the United States Patent and Trademark Office*